(12) United States Patent
Inuzuka

(10) Patent No.: US 12,474,661 B2
(45) Date of Patent: Nov. 18, 2025

(54) OPTICAL DETECTING APPARATUS AND IMAGE FORMING APPARATUS

(71) Applicant: BROTHER KOGYO KABUSHIKI KAISHA, Nagoya (JP)

(72) Inventor: Mikio Inuzuka, Okazaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 116 days.

(21) Appl. No.: 18/593,613

(22) Filed: Mar. 1, 2024

(65) Prior Publication Data

US 2024/0361719 A1    Oct. 31, 2024

(30) Foreign Application Priority Data

Apr. 26, 2023    (JP) .................................. 2023-072792

(51) Int. Cl.
| | | |
|---|---|---|
| G03G 15/00 | (2006.01) | |
| G01D 11/24 | (2006.01) | |
| G01D 11/30 | (2006.01) | |
| G03G 15/01 | (2006.01) | |

(52) U.S. Cl.
CPC ......... *G03G 15/5058* (2013.01); *G01D 11/24* (2013.01); *G01D 11/30* (2013.01); *G03G 15/0131* (2013.01); *G03G 2215/00059* (2013.01); *G03G 2215/00063* (2013.01)

(58) Field of Classification Search
CPC ........... G03G 15/0131; G03G 15/5058; G03G 2215/00059; G03G 2215/00063; G01D 11/24; G01D 11/30
See application file for complete search history.

(56) References Cited

U.S. PATENT DOCUMENTS

| | | | |
|---|---|---|---|
| 12,225,163 B2 * | 2/2025 | Yasuda | ............... H04N 1/00095 |
| 2015/0003853 A1 * | 1/2015 | Nakagawa | ......... G03G 15/5058 |
| | | | 399/49 |

FOREIGN PATENT DOCUMENTS

| | | |
|---|---|---|
| JP | H04-252652 A | 9/1992 |
| JP | 2014-026225 A | 2/2014 |
| JP | 2015-082065 A | 4/2015 |

* cited by examiner

*Primary Examiner* — Kevin K Pyo
(74) *Attorney, Agent, or Firm* — Baker Botts L.L.P.

(57) ABSTRACT

An optical detecting apparatus includes a substrate having a surface, on which a light emitter and a first light receiver are arranged, and a housing. The housing has a fixture surface, onto which the surface of the substrate is fixed, and an attachable surface on a side opposite to the fixture surface. The housing includes an emitted-light guiding path formed through the housing between the fixture surface and the attachable surface for light emitted from the light emitter to pass there-through and a first receiving-light guiding path formed through the housing between the fixture surface and the attachable surface for light to be received by the first light receiver to pass there-through. The housing includes an attachable portion formed on the attachable surface. The attachable portion protrudes in a direction to extend away from the substrate.

14 Claims, 24 Drawing Sheets

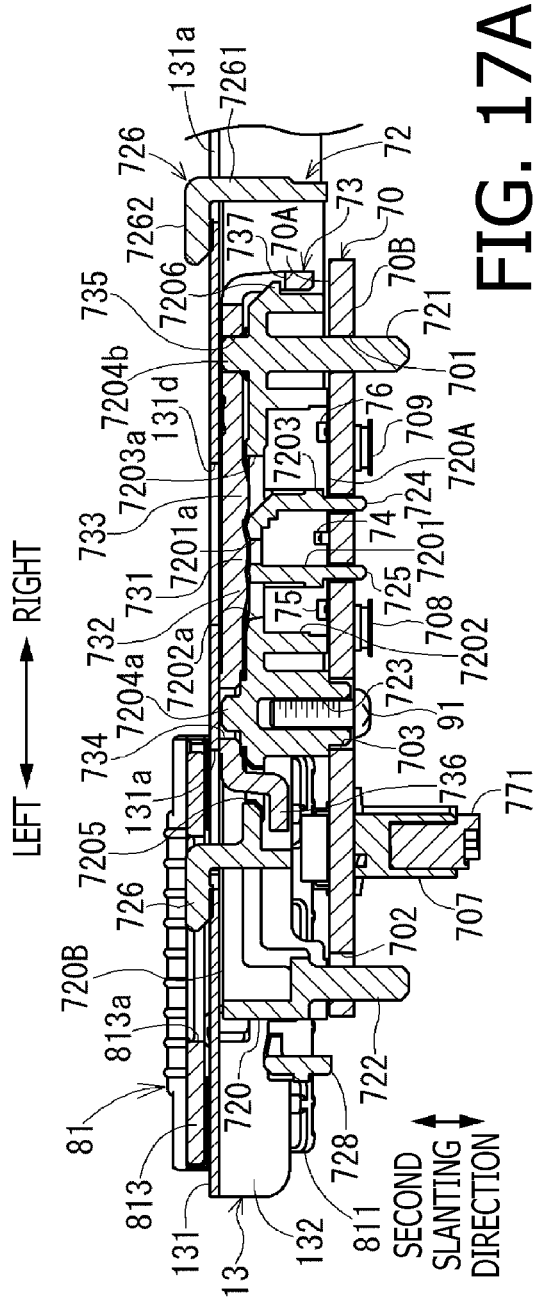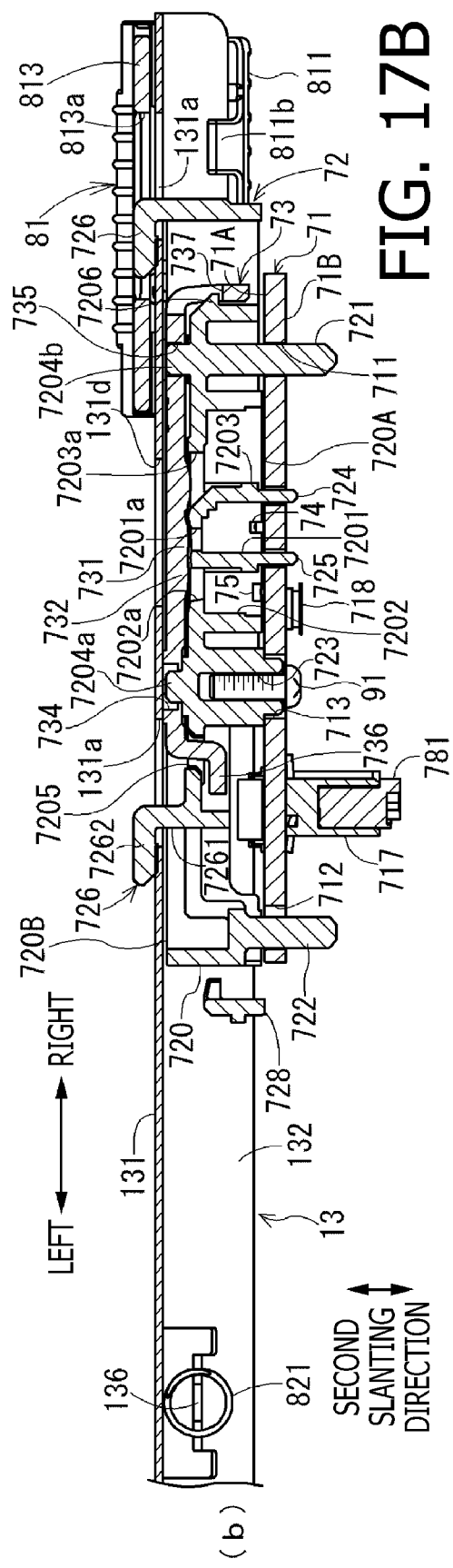

OPTICAL DETECTING APPARATUS AND IMAGE FORMING APPARATUS

REFERENCE TO RELATED APPLICATIONS

This application claims priority from Japanese Patent Application No. 2023-072792, filed on Apr. 26, 2023. The entire content of the priority application is incorporated herein by reference.

BACKGROUND ART

An image forming apparatus, which may form patches in toners on a belt for conveying a sheet and read the patches formed on the belt by a sensor unit in an optical detecting apparatus to correct density and color misalignment of the toners, is known.

The sensor unit may include a substrate, on which a light emitter and a light receiver are mounted, and a housing, in which light-guiding paths to guide the light emitted from the light emitter and the light to be received by the light receiver are formed. The substrate and the housing may each have holes, in which fastening members may be inserted. The fastening members inserted in the holes may be tightened to a fixture member, such as a stay, so that the substrate and the housing may be bound to the fixture member.

SUMMARY

In the sensor unit, where the substrate and the housing are bound to the fixture member by the common fastening members, the housing may have positioning pins to prevent misalignment between the substrate and the housing. For binding the substrate and the housing to the fixture member, a worker may need to hold the substrate against the housing while fastening the housing and the substrate with the fastening member. As such, working efficiency to bind the substrate and the housing to the fixture member may have been difficult to improve.

Moreover, when, for example, the substrate is to be replaced with another, once the fastening members are removed, the substrate and the housing are detached, and one of them may accidentally fall off in the image forming apparatus. As such, working efficiency to replace the substrate may have been difficult to improve.

The present disclosure relates to an optical detecting apparatus and an image forming apparatus, in which a substrate and a housing may be assembled together easily.

According to an aspect of the present disclosure, an optical detecting apparatus includes a substrate having a surface, on which a light emitter and a first light receiver are arranged, and a housing. The housing has a fixture surface, onto which the surface of the substrate is fixed, and an attachable surface on a side opposite to the fixture surface. The housing includes an emitted-light guiding path formed through the housing between the fixture surface and the attachable surface for light emitted from the light emitter to pass there-through and a first receiving-light guiding path formed through the housing between the fixture surface and the attachable surface for light to be received by the first light receiver to pass there-through. The housing includes an attachable portion formed on the attachable surface. The attachable portion protrudes in a direction to extend away from the substrate.

According to another aspect of the present disclosure, an image forming apparatus includes a main frame, a fixture metal plate configured to be fixed to the main frame, a belt configured to convey a sheet for forming an image in toner on the sheet, and an optical detecting apparatus mounted on the fixture metal plate and located at a position to face the belt. The optical detecting apparatus includes a substrate having a surface, on which a light emitter and a light receiver are arranged, and a housing. The housing has a fixture surface, onto which the surface of the substrate is fixed, and an attachable surface on a side opposite to the fixture surface. The housing includes an emitted-light guiding path formed through the housing between the fixture surface and the attachable surface for light emitted from the light emitter to pass there-through and a receiving-light guiding path formed through the housing between the fixture surface and the attachable surface for light to be received by the light receiver to pass there-through. The housing includes an attachable portion formed on the attachable surface. The attachable portion protrudes in a direction to extend away from the substrate.

BRIEF DESCRIPTION OF DRAWINGS

FIGS. 17A-17B are cross-sectional views of the fixture metal plate with the sensor unit, the ground spring, and the fixing members, viewed along a first slanting direction.

DESCRIPTION

An embodiment of the present disclosure will be described below with reference to the accompanying drawings.

Image Forming Apparatus

Figure 1:
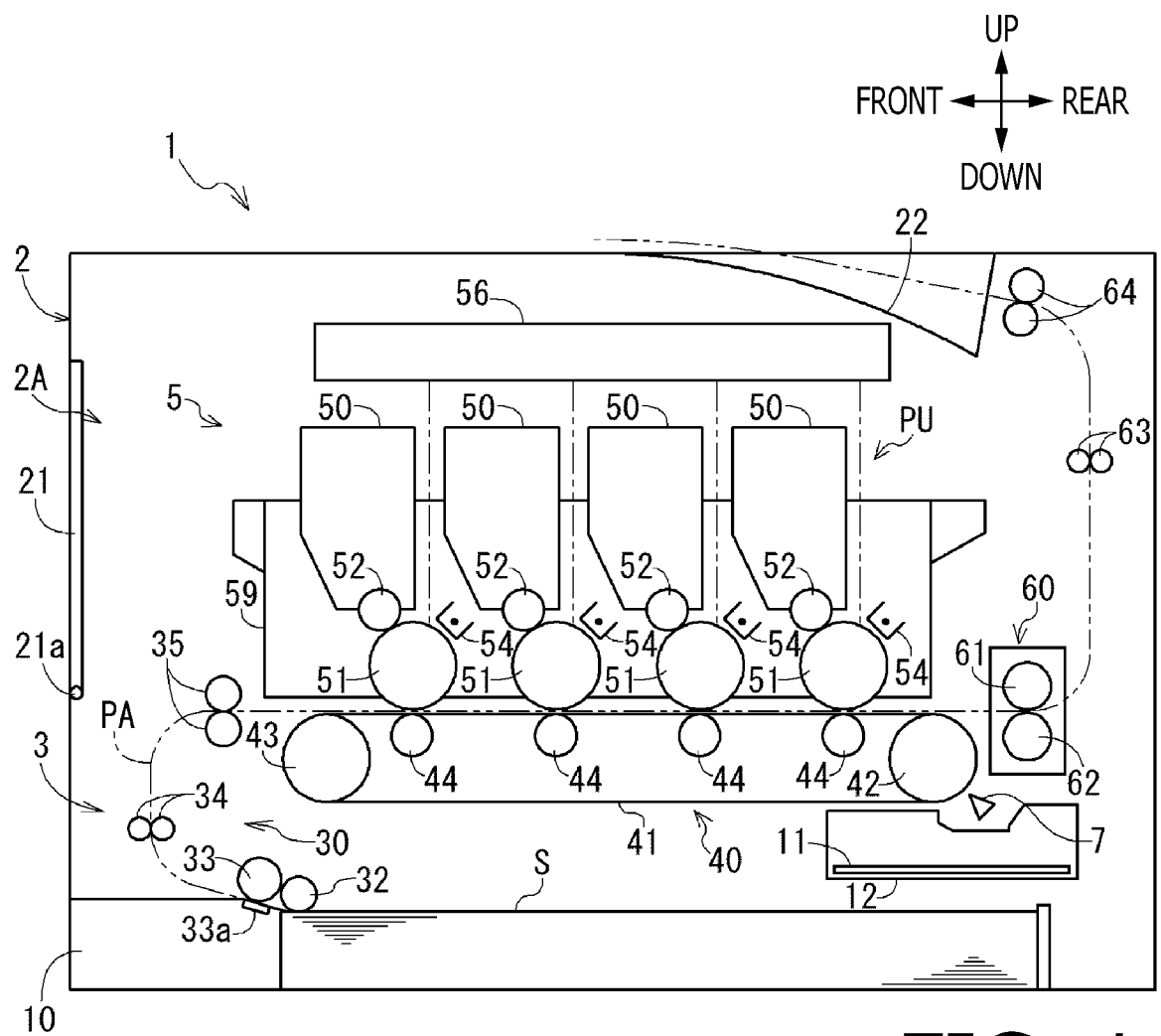
FIG. 1 is a cross-sectional overall view of an image forming apparatus.
Figure 2:
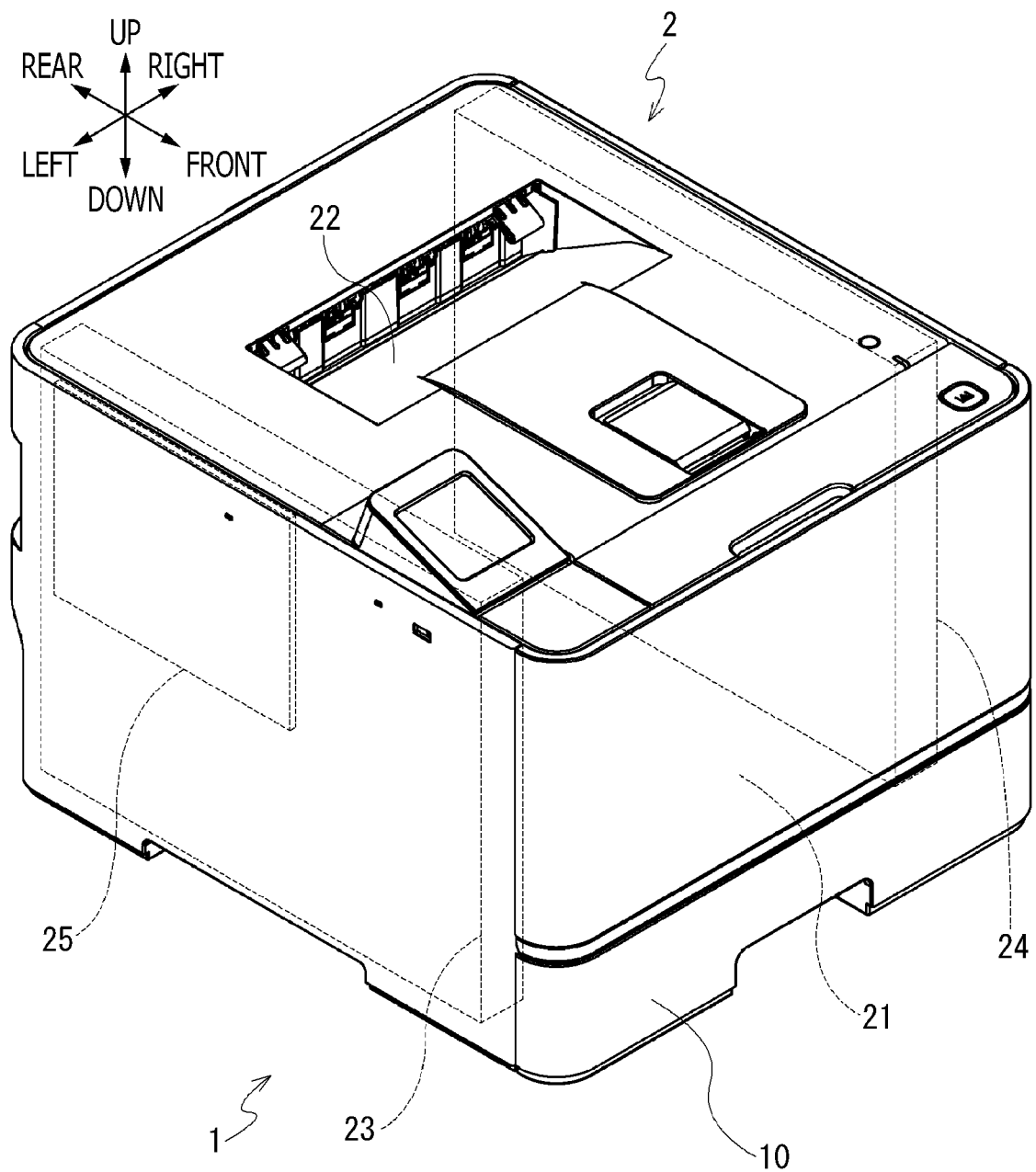
FIG. 2 is a perspective view of the image forming apparatus.

An image forming apparatus 1 shown in FIGS. 1 and 2 is an example of the image forming apparatus with the optical detecting apparatus according to the present disclosure. The image forming apparatus 1 is a multicolor laser printer that may form a multicolored image on a sheet S electro-photographically.

In the description below, positional relation in the image forming apparatus 1 including parts and devices in the image forming apparatus 1 will be based on the orientations indicated by arrows in FIG. 1. In other words, a left-hand side and a right-hand side of FIG. 1 to a viewer are defined as a front side and a rear side of the image forming apparatus 1, and a nearer side and farther side in a direction of depth to the viewer of FIG. 1 are defined as a leftward side and a rightward side of the image forming apparatus 1. A front-to-rear or rear-to-front direction may be called a front-rear direction, and a left-to-right or right-to-rear direction may herein be called a right-left direction. An upper side and a lower side to the viewer of FIG. 1 are defined as an upper side and a lower side of the image forming apparatus 1. An up-to-down or down-to-up direction may herein be called a vertical direction.

The image forming apparatus 1 includes a body 2, a sheet feeder 3, and an image forming device 5. The sheet feeder 3 includes a feeder tray 10 to support sheets S and a sheet conveyer 30 to convey the sheets S. The image forming device 5 may form images on the sheets S conveyed by the sheet conveyer 30.

The body 2 has an approximately parallelepiped shape and accommodates the sheet feeder 3 and the image forming device 5. A front side of the body 2 has a frontward opening 2A, and the body 2 includes a front cover 21 that may open and close the frontward opening 2A.

The front cover 21 is pivotable about a pivot axis 21a, which is at a lower end thereof. The front cover 21 pivoting about the pivot axis 21a may move between a closing position, at which the front cover 21 closes the frontward opening 2A, and an open position, at which the front cover 21 exposes the frontward opening 2A. On an upper side of the body 2, an ejection tray 22, which inclines to be higher on the front side and lower on the rear side, is formed.

The sheet feeder 3 is located in a lower area in the body 2. The sheet feeder 3 includes the sheet conveyer 30, which may convey the sheets S supported by the feeder tray 10 to the image forming device 5 in a conveying direction. The feeder tray 10 is slidable in the front-rear direction and is movable between a stowed position, at which the feeder tray 10 is stowed in the body 2, and a separated position, at which the feeder tray 10 is drawn frontward from the stowed position.

The sheet conveyer 30 includes a feeder roller 32, a separator roller 33, a separator pad 33a, a conveyer roller pair 34, and a registration roller pair 35. Inside the body 2, a conveyer path PA to coney the sheets S is formed. The conveyer path PA extends from the feeder tray 10 through the image forming device 5 to the ejection tray 22.

The sheets S supported by the feeder tray 10 may be separated from one another by the feeder roller 32, the separator roller 33, and the separator pad 33a and fed to the conveyer path PA. The feeder roller 32 may convey the sheets S from the feeder tray 10 toward the image forming device 5. The separator roller 33 and the separator pad 33a may separate one of the sheets S supported by the feeder tray 10 from the other.

The sheet S separately fed to the conveyer path PA may be conveyed by the conveyer roller pair 34 and the registration roller pair 35 toward the image forming device 5. The registration roller pair 35 may stop the sheet S being conveyed temporarily to regulate a position of a leading edge of the sheet S and resume conveying the sheet S at a predetermined timing toward the image forming device 5.

The image forming device 5 is located above the sheet feeder 3 and includes four toner cartridges 50 aligned in the front-rear direction and four photosensitive drums 51, which are in one-to-one correspondence with the toner cartridges 50. The toner cartridges 50 are provided in one-to-one correspondence with colors of black, yellow, magenta, and cyan. Each toner cartridge 50 includes a developing roller 52.

The toner cartridges 50 are detachably supported by a drawer 59. The drawer 59 is, when the front cover 21 is open, movable between a first position, at which the drawer 59 is located inside the body 2, and a second position, at which the drawer 59 is at least partly located outside the body 2, through the frontward opening 2A.

The photosensitive drums 51 are each in a substantially cylindrical form with an axis thereof extending in the right-left direction and are supported rotatably by the drawer 59. The developing roller 52 in each photosensitive drum 51 extends in the right-left direction and is rotatably supported by the corresponding one of the toner cartridges 50. The developing roller 52 may supply toner to the photosensitive drum 51.

The body 2 contains an exposure device 56, which may irradiate surfaces of the photosensitive drums 51. The exposure device 56 includes laser diodes, deflectors, lenses, and mirrors, which are not shown. The exposure device 56 may emit beams at the photosensitive drums 51 and irradiate the surfaces of the photosensitive drums 51.

At a position below the photosensitive drums 51, a transfer belt 41 is located to oppose the photosensitive drums 51 across the conveyer path PA. The transfer belt 41 is in contact with the photosensitive drums 51. The transfer belt 41 is strained around a driving roller 42 and a driven roller 43 which is located frontward with respect to the driving roller 42, and extends in the front-rear direction. At positions opposite to the photosensitive drums 51 across the transfer belt 41, transfer rollers 44 are provided. In the image forming device 5, devices including the transfer belt 41, the driving roller 42, the driven roller 43, and the transfer rollers 44 form the transfer unit 40.

The image forming device 5 include chargers 54 for charging the photosensitive drums 51. The chargers 54 are supported by the drawer 59. The photosensitive drums 51 charged evenly the chargers 54 may be selectively exposed to the beams from the exposure device 56, and in the regions on the surfaces of the photosensitive drums 51 exposed to the beams, potentials are removed. As such, electrostatic latent images may be formed on the surfaces of the photosensitive drums 51.

The toners stored in the toner cartridges 50 are charged positively and are carried on surfaces of the developing rollers 52. To each developing roller 52, developing bias is applied, and when the electrostatic latent image formed on the photosensitive drum 51 face the developing roller 52, due to the potential difference between the electrostatic latent image and the developing roller 52, the toner on the developing roller 52 may be supplied to the electrostatic latent image. As such, toner images may be formed on the surfaces of the photosensitive drums 51.

As the sheet S being conveyed toward the image forming device 5 reaches the transfer belt 41, the sheet S may be conveyed further by the transfer rollers 44 to pass through the positions between the transfer belt 41 and the photosensitive drums 51 one after another. As such, when the toner images carried on the surfaces of the photosensitive drums 51 reach to the positions face the sheet S, the toners may be transferred onto the sheet S by the transfer bias applied to the transfer rollers 44. The transfer belt 41 is an example of the belt to convey the sheet for forming an image in toner on the sheet.

Meanwhile, it may be noted that the belt in the image forming apparatus 1 may not necessarily be limited to the transfer belt 41 for conveying the sheet S, onto which the toner images may be transferred, but may be an intermediate transfer belt, onto which the toner images may be transferred, and from which the toner images may be further transferred to the sheet S.

The sheet S with the transferred toner images thereon may be conveyed to the fuser 60. The fuser 60 is located rearward with respect to the transfer belt 41 in the front-rear direction. The fuser 60 includes a heat roller 61 and a pressure roller 62 pressed against the heat roller 61. The sheet S conveyed to the fuser 60 may pass through the position between the heat roller 61 and the pressure roller 62, and thereby, the toner images may be thermally fused and fixed onto the sheet S. In other words, the fuser 60 may fix the toner images on the sheet S.

The sheet S with the fixed toner images may be conveyed downstream in the conveying direction further from the fuser 60 by an intermediate ejection roller pair 63 and by an ejection roller pair 64 located downstream of the intermediate ejection roller pair 63 in the conveying direction, and ejected at the ejection tray 22.

In the image forming apparatus 1, devices including the drawer 59, the toner cartridges 50 supported by the drawer 59, the photosensitive drums 51, and the chargers 54 form a process unit PU, which may form the toner images on the sheet S. In the process unit PU, the photosensitive drums 51 may be supported either by the drawer 59, as the photosensitive drums 51 in the present embodiment, or by the toner cartridges 50. Optionally, the process unit PU may include the fuser 60.

The image forming apparatus 1 includes a power supply board 11, on which a power circuit is formed, and a substrate cover 12 to cover the power supply board 11. The substrate cover 12 is formed of metal with conductivity and is grounded. In other words, the substrate cover 12 is a grounding member. The substrate cover 12 is located between the feeder tray 10 and the transfer unit 40 in a rearward area inside the body 2. The body 2 accommodates the process unit PU and the substrate cover 12.

Figure 3:
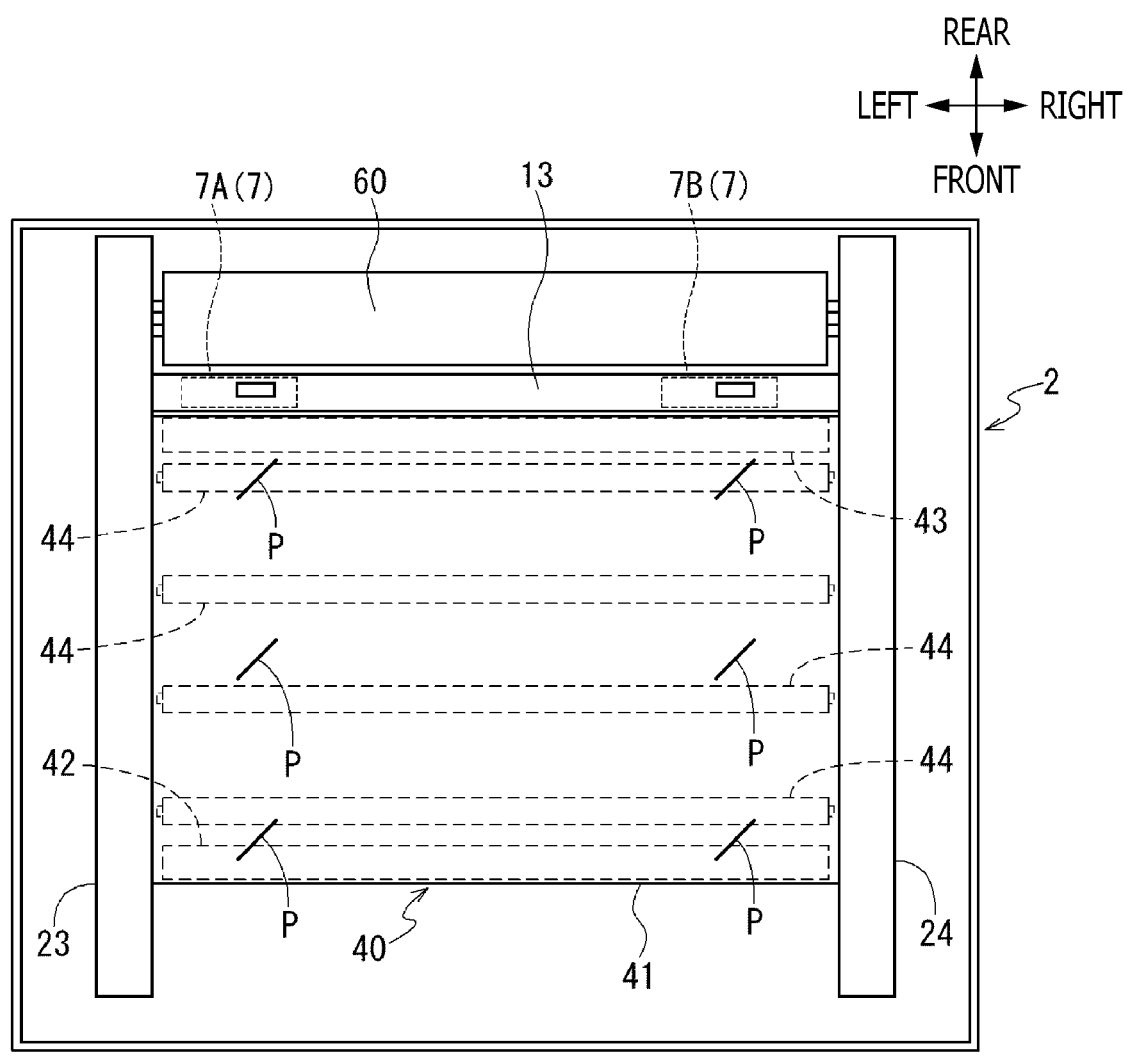
FIG. 3 is a plan view inside the image forming apparatus.

For a purpose to correct density and misalignment of the colors in the images to be formed on the sheet S, the image forming apparatus 1 may form patches P on the transfer belt 41, as shown in FIG. 3. The patches P may be formed on the transfer belt 41 by transferring the toner from the photosensitive drums 51 to the surface of the transfer belt 41. The image forming apparatus 1 has a sensor unit 7, which may detect and read the patches P formed on the surface of the transfer belt 41. Based on the result of the reading, density and color misalignment of the toners of the images may be corrected. The fuser 60 is located at an upper-rearward position with respect to the sensor unit 7.

The sensor unit 7 is an optical detecting apparatus, which includes a light-emitter to emit light at the surface of the transfer belt 41 and a light receiver to receive the light reflected off the transfer belt 41 and is thereby capable of detecting the patches P.

The sensor unit 7 is located lower-rearward with respect to the driving roller 42 in the transfer unit 40. In other words, the sensor unit 7 is located at a position on a lower side and rear side of the transfer belt. The sensor unit 7 is located to face the transfer belt 41. Accordingly, the sensor unit 7 may emit light at the surface of the transfer belt 41 and receive the light reflected off the transfer belt 41 easily, and thereby read the patches P formed on the transfer belt 41.

In the transfer unit 40, a plurality of patches P may be formed along the front-rear direction in two regions in the right-left directions, i.e., in a leftward region and a rightward region, on the surface of the transfer belt 41. The sensor unit 7 includes two sensor units, i.e., a first sensor unit 7A and a second sensor unit 7B, which are located leftward and rightward, respectively, at positions corresponding to the patches P to be formed on the transfer belt 41.

The patches P may be detected by the sensor unit 7 in the state where the transfer unit 40 is mounted in the body 2. As such, with the two patches being located apart from each other in the right-left direction, accuracy to correct the densities and the color misalignment in the images to be formed on the sheet S may be improved.

As shown in FIG. 2, the body 2 includes a first main frame 23 and a second main frame 24 which is located apart from the first main frame 23 in the right-left direction. The first main frame 23 and the second main frame 24 are an example of the main frame. The first main frame 23 is located at a leftward end of the body 2 and spreads in the front-rear direction and the vertical direction. The second main frame 24 is located at a rightward end of the body 2 and spreads in the front-rear direction and the vertical direction. The first main frame 23 supports a control board 25, in which detection signals from the sensor unit 7 may be input, on a leftward surface thereof.

Figure 4:
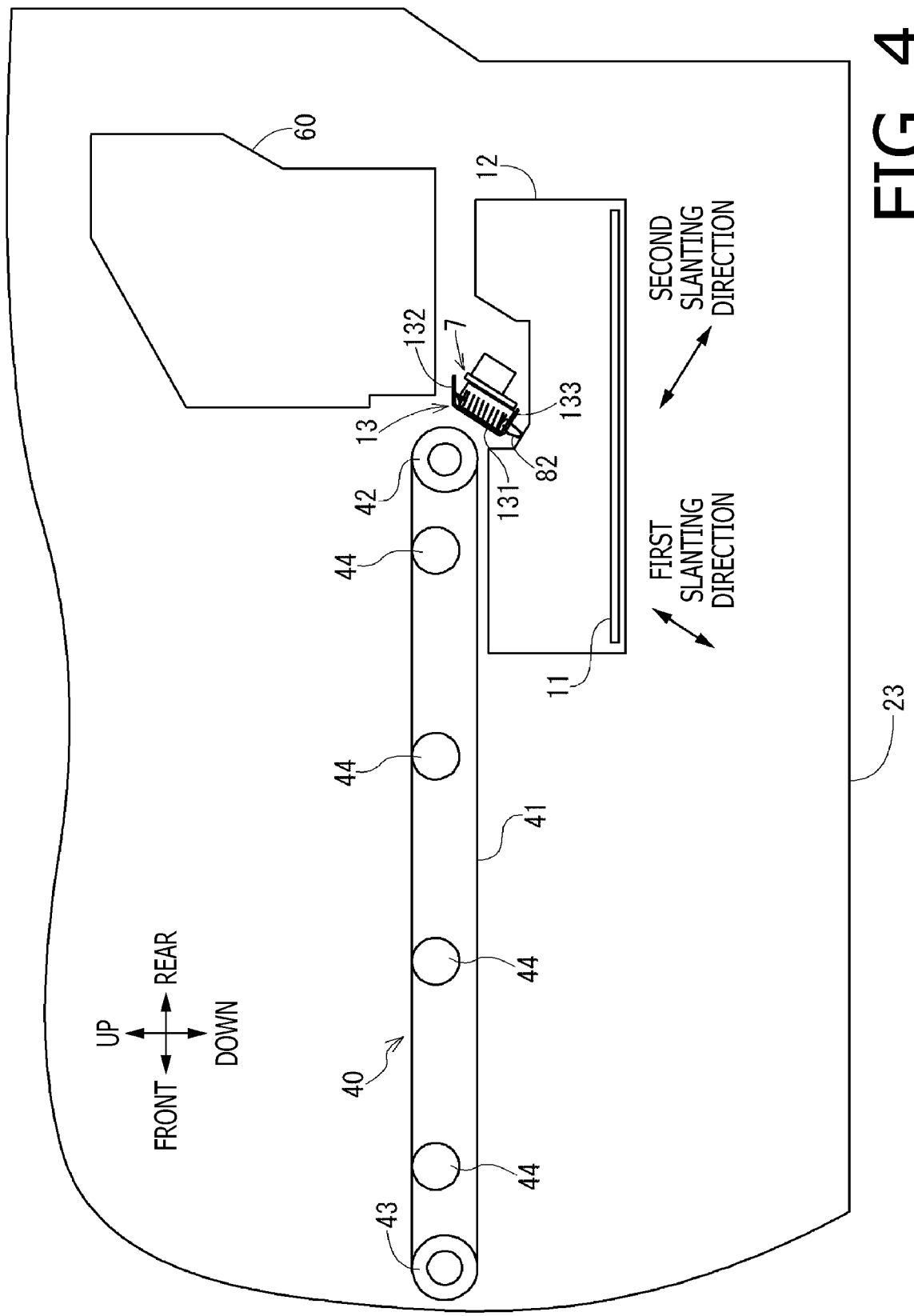
FIG. 4 is a side view of the image forming apparatus illustrating positions of a transfer unit, a sensor unit, and a fuser.

As shown in FIGS. 3 and 4, the sensor unit 7 is mounted on a fixture metal plate 13, and the fixture metal plate 13 is supported by the first main frame 23 and the second main frame 24. The fixture metal plate 13 extends in the right-left direction and is located between the first main frame 23 and the second main frame 24 in the right-left direction.

The fixture metal plate 13 is fixed to the first main frame 23 and the second main frame 24 to connect the first main frame 23 and the second main frame 24. As such, the fixture metal plate 13 may be supported stably by the first main frame 23 and the second main frame 24.

The fixture metal plate 13 retains the first sensor unit 7A at a position, in the right-left direction, closer to the first main frame 23 than to the second main frame 24, and the second sensor unit 7B at a position, in the right-left direction, closer to the second main frame 24 than to the first main frame 23.

The first sensor unit 7A is mounted on a leftward end portion of the fixture metal plate 13, and the second sensor unit 7B is mounted on a rightward end portion of the fixture metal plate 13, in the right-left direction.

Figure 5:
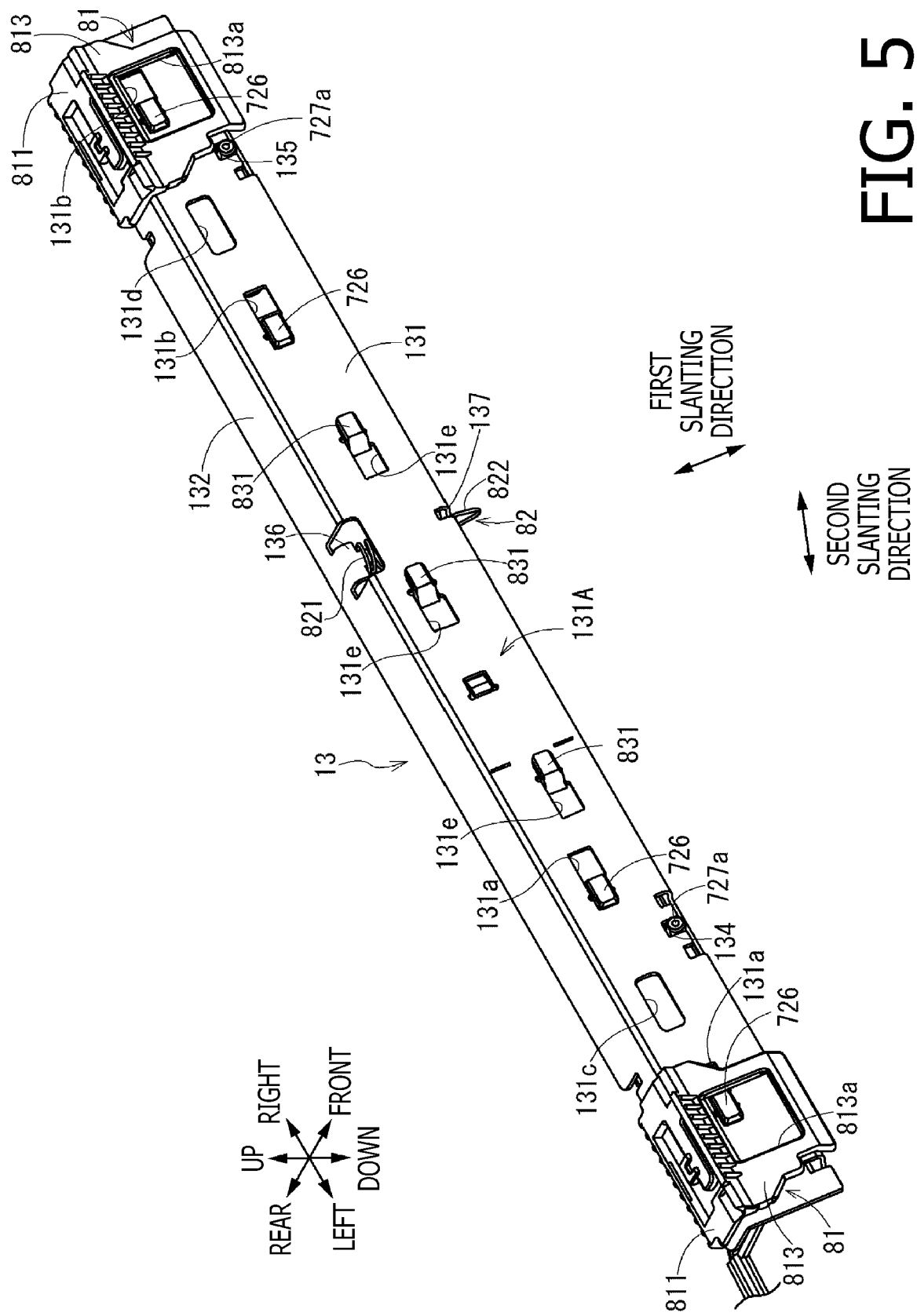
FIG. 5 is a frontward perspective view of a fixture metal plate.
Figure 6:
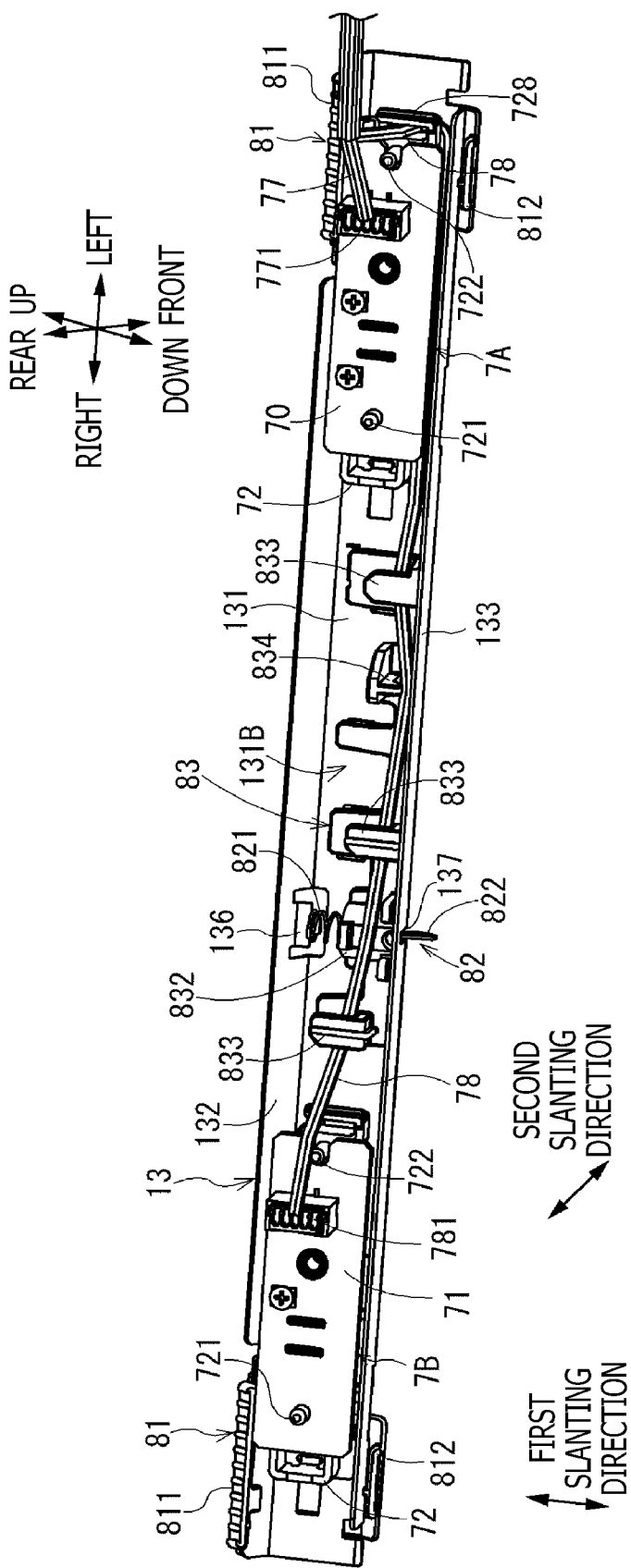
FIG. 6 is a rearward perspective view of the fixture metal plate.
Figure 7:
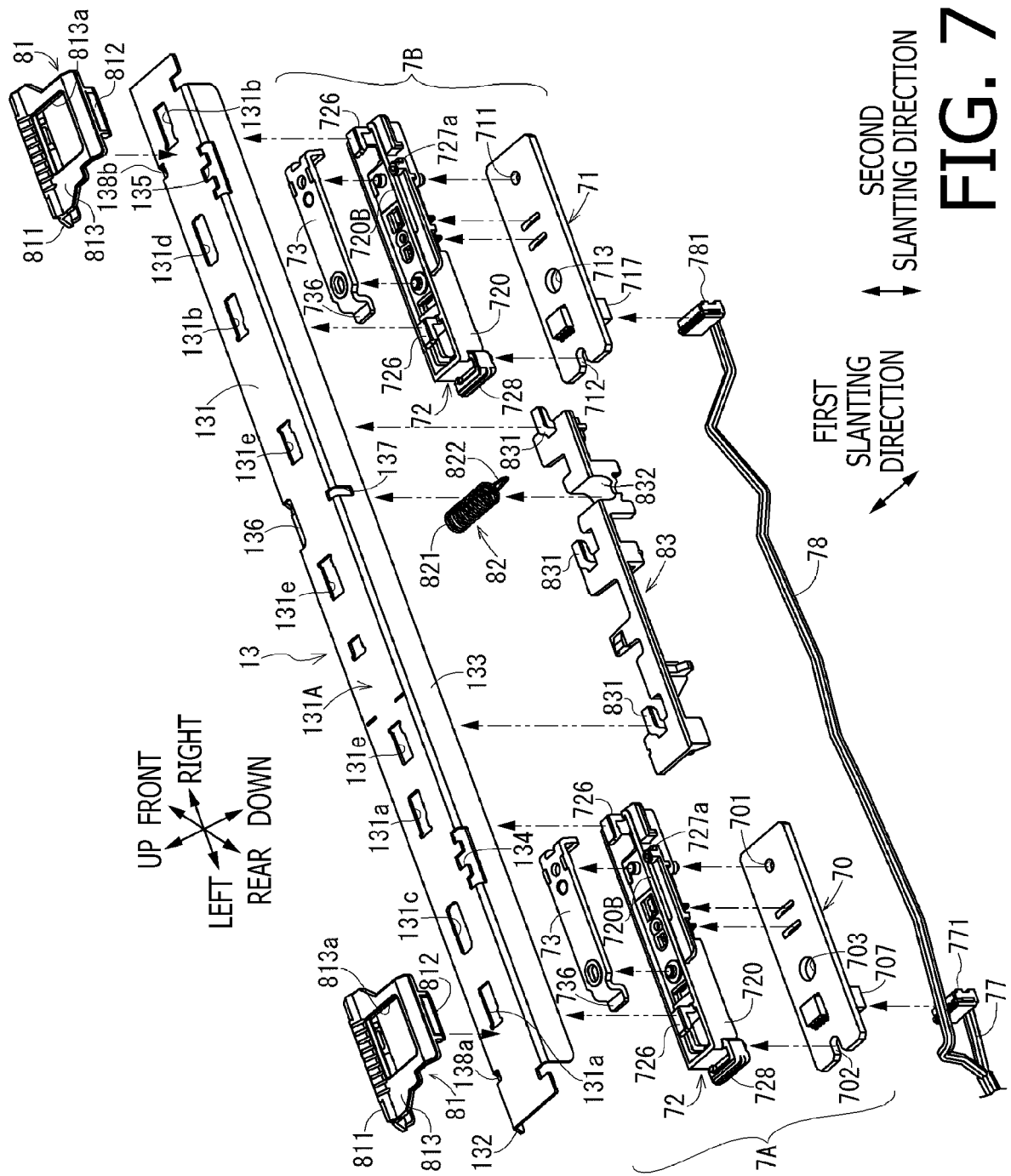
FIG. 7 is an exploded view of the fixture metal plate with the sensor unit, a ground spring, fixing members, and a spring guide.

As shown in FIGS. 5-7, on the fixture metal plate 13, the first sensor unit 7A, the second sensor unit 7B, fixing members 81, a ground spring 82, and a spring guide 83 are mounted. The fixing members 81 are mounted on the leftward end portion and the rightward end portion of the fixture metal plate 13. The ground spring 82 and the spring guide 83 are mounted on the fixture metal plate 13 at positions between the first sensor unit 7A and the second sensor unit 7B.

Fixture Metal Plate

Figure 8A:
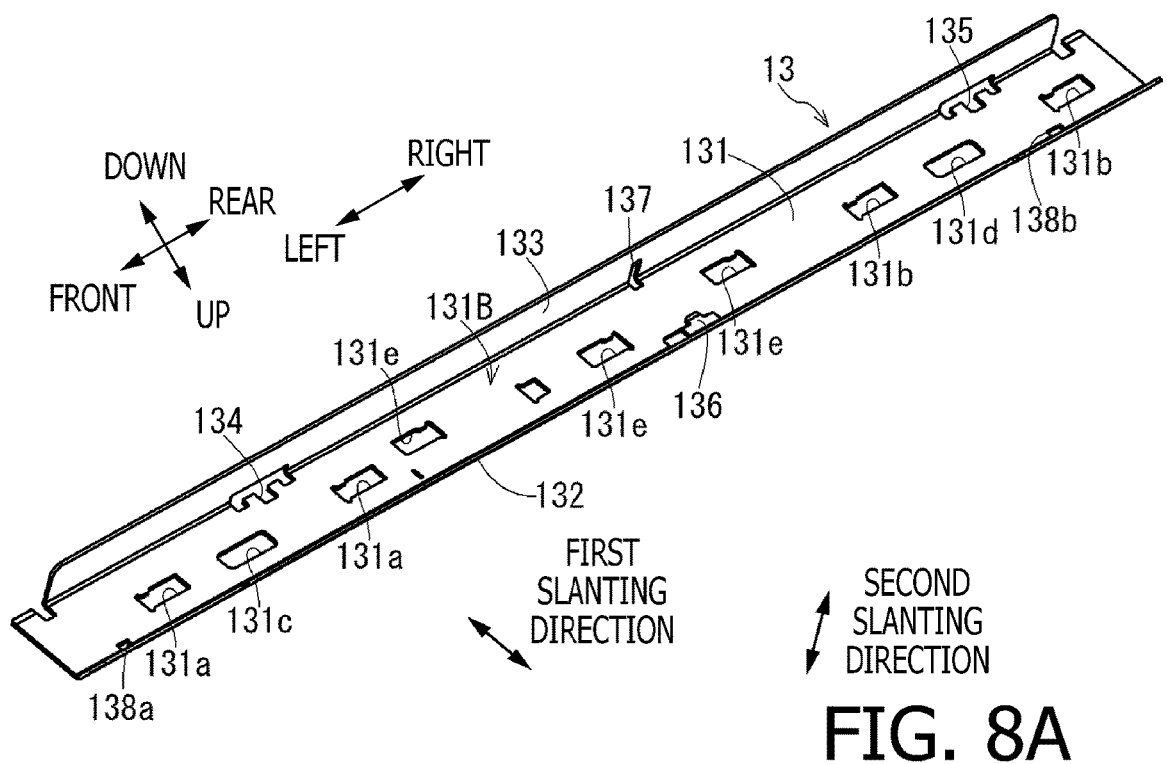
FIGS. 8A-8B are perspective views of the fixture metal plate.
Figure 8B:
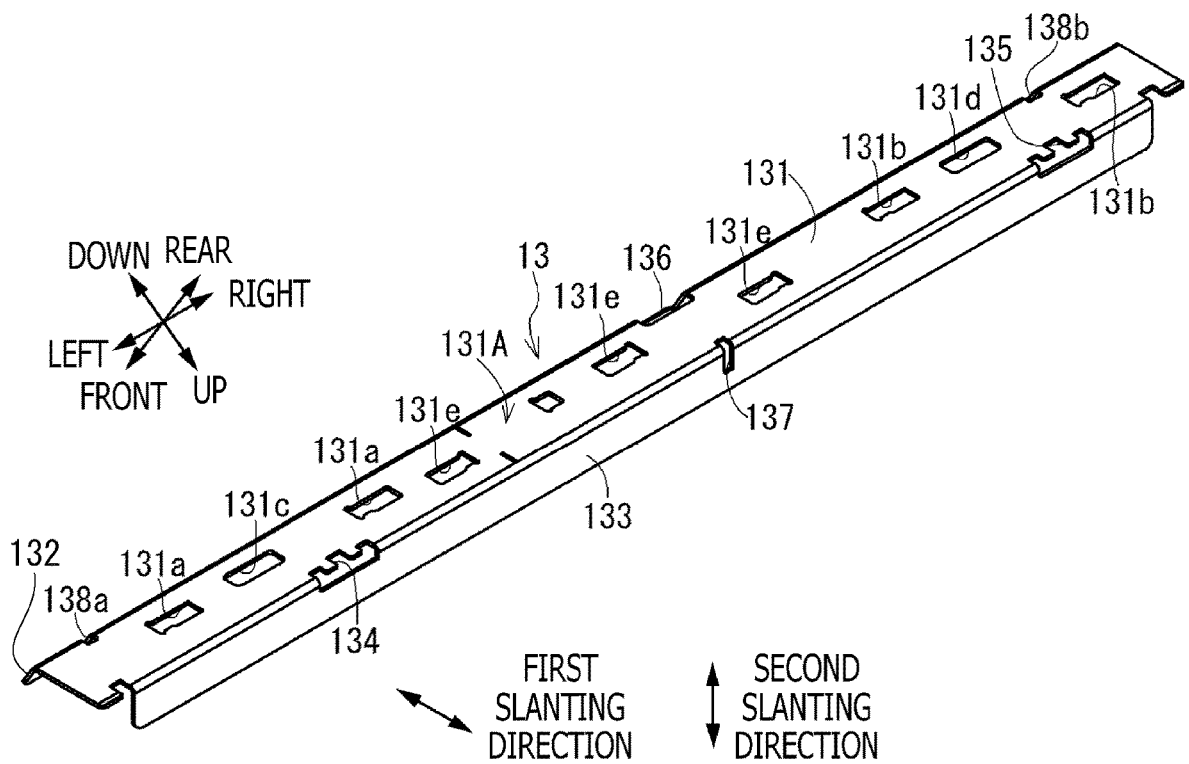

As shown in FIGS. 4 and 8A-8B, the fixture metal plate 13 is formed of a piece of metal longitudinally extending in the right-left direction and includes a plate section 131, a first bent section 132, and a second bent section 133. The plate section 131 spreads in the right-left direction and a first slanting direction, which intersects the orthogonally with the right-left direction. The first slanting direction is a direction slanting to be higher on a rear side thereof and lower on a front side thereof. The plate section 131 includes a first surface 131A, which faces the transfer belt 41, and a second surface 131B, which is opposite to the first surface 131A.

The first bent section 132 is continuous from an upper end of the plate section 131, which is one end in the first slanting direction, and extends rearward from the upper end of the plate section 131. The second bent section 133 is continuous from a lower end of the plate section 131, which is the other end in the first slanting direction, and extends from the lower end of the plate section 131 in a second slanting direction. The second bent section 133 spreads in the second slanting direction and the right-left direction. The second slanting direction is a direction slanting to be lower on a rear side thereof and higher on a front side thereof and intersects orthogonally with the right-left direction and the first slanting direction.

The first bent section 132 may be formed by bending an upper part of the fixture metal plate 13, and the second bent section 133 may be formed by bending a lower part of the fixture metal plate 13. As such, the plate section 131 is enhanced by the first bent section 132, which is located on the upper end thereof, and the second bent section 133, which is located on the lower end thereof.

First Guide Section

Figure 9A:
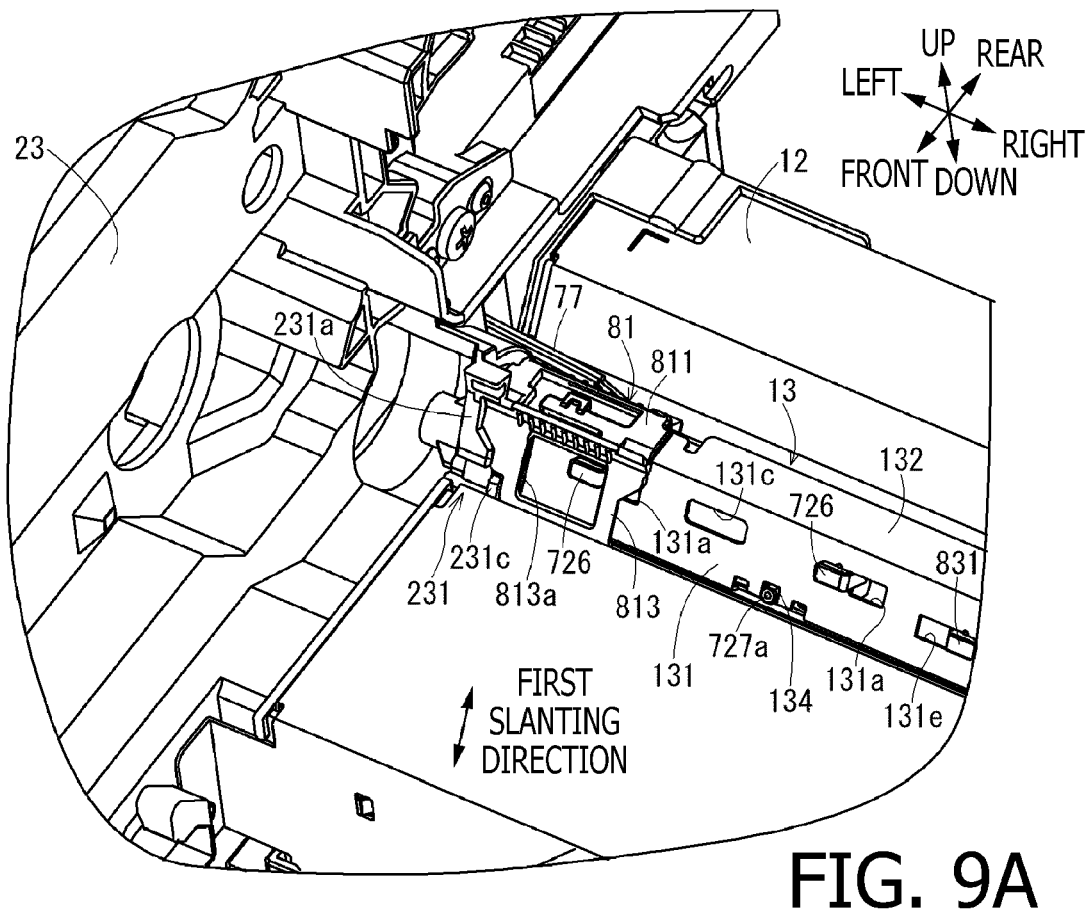
FIGS. 9A-9B are perspective views of a first guide section and a leftward end portion of the fixture metal plate.
Figure 9B:
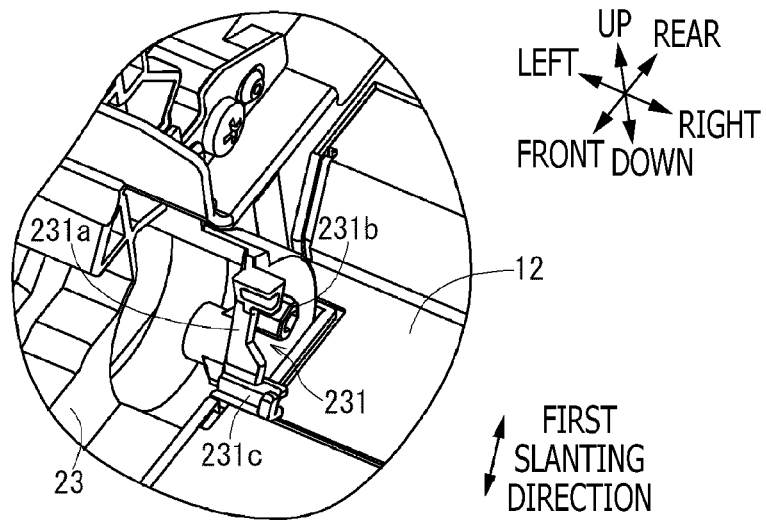
Figure 10:
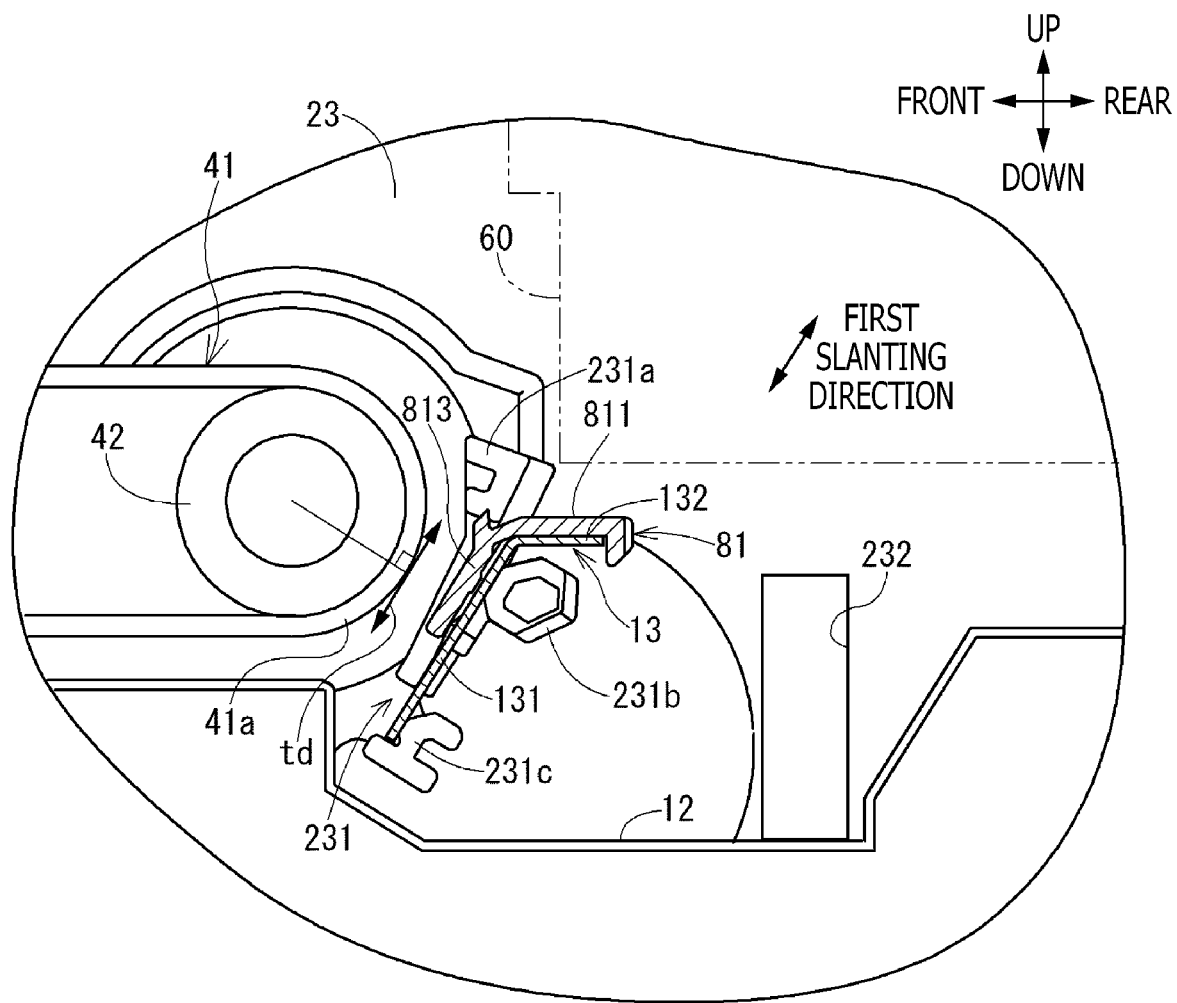
FIG. 10 is a sideward cross-sectional view of the first guide section and the leftward end portion of the fixture metal plate.

As shown in FIGS. 9A-9B and 10, the first main frame 23 includes a first guide section 231, which supports the leftward end portion of the fixture metal plate 13. The first guide section 231 is located at a position on the lower side and the rear side of the transfer belt 41.

The first guide section 231 includes a first guiding piece 231a, a second guiding piece 231b, and a third guiding piece 231c. The first guiding piece 231a extends along the first slanting direction. The first guiding piece 231a is, when the fixture metal plate 13 is guided by the first guide section 231 at the leftward end portion, located frontward with respect to the plate section 131 of the fixture metal plate 13 and supports the plate section 131 on the first surface 131A.

The second guiding piece 231b is located rearward with respect to the first guiding piece 231a. The second guiding piece 231b is, when the fixture metal plate 13 is guided by the first guide section 231 at the leftward end portion, located rearward with respect to the plate section 131 of the fixture metal plate 13 and supports the plate section 131 on the second surface 131B. The third guiding piece 231c is located lower-frontward with respect to the second guiding piece 231b. The third guiding piece 231c is, when the fixture metal plate 13 is guided by the first guide section 231 at the leftward end portion, located to be lower-rearward with respect to the plate section 131 of the fixture metal plate 13 and supports a lower end of the plate section 131 on the second surface 131B.

The first guide section 231 is configured to receive the leftward end portion of the fixture metal plate 13 being inserted therein from an upper-rearward side. The fixture metal plate 13 inserted in the first guide section 231 is guided by the first guiding piece 231a, the second guiding piece 231b, and the third guiding piece 231c of the first guide section 231 along the first slanting direction. As such, the first guide section 231 may guide the fixture metal plate 13 in the first slanting direction.

As shown in FIG. 10, the transfer belt 41 includes a curved section 41a, which curves in an arc, at a rear end thereof, and the first slanting direction extends along a tangential direction td, which is tangent to the curved section 41a at a position in a lower half of the curved section 41a. An upper side in the first slanting direction is a side, at which the fuser 60 is located with respect to the first guide section 231. In other words, the fuser 60 is located on the upper side of the first guide section 231 in the first slanting direction.

Second Guide Section

Figure 11A:
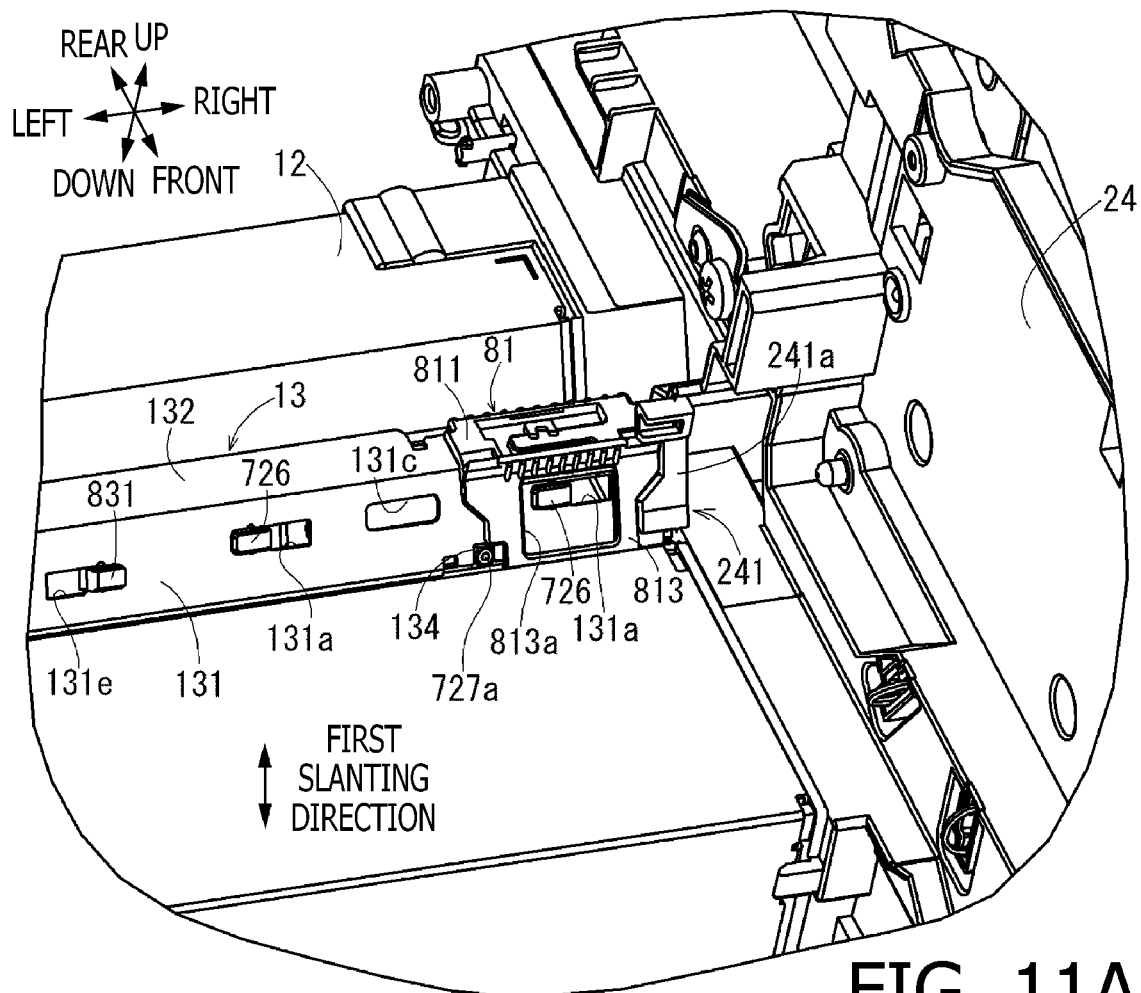
FIGS. 11A-11B are perspective views of a second guide section and a rightward end portion of the fixture metal plate.
Figure 11B:
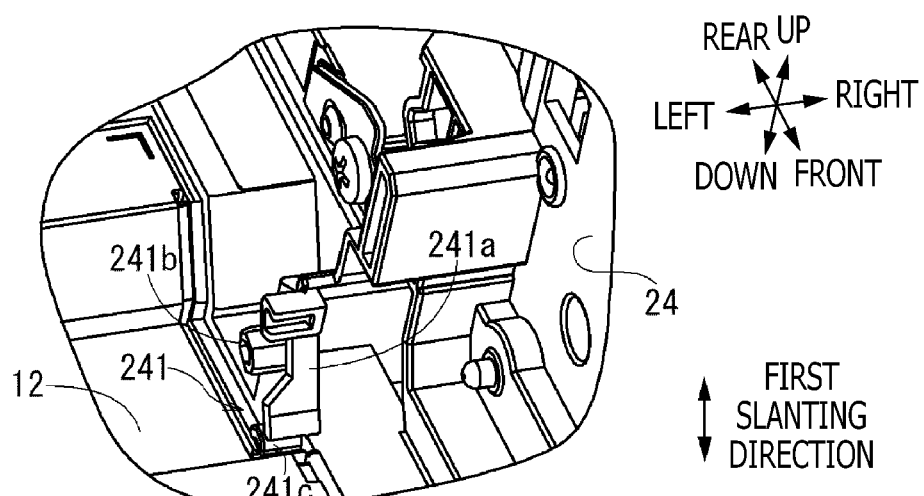

As shown in FIGS. 11A-11B, the second main frame 24 includes a second guide section 241, which supports the rightward end portion of the fixture metal plate 13. The second guide section 241 is substantially in the same form as the first guide section 231 and includes a first guiding piece 241a, a second guiding piece 241b, and a third guiding piece 241c. The first guiding piece 241a extends along the first slanting direction. The first guiding piece 241a is, when the fixture metal plate 13 is guided by the second guide section 241 at the rightward end portion, located frontward with respect to the plate section 131 of the fixture metal plate 13 and supports the plate section 131 on the first surface 131A.

The second guiding piece 241b is located rearward with respect to the first guiding piece 241a. The second guiding piece 241b is, when the fixture metal plate 13 is guided by the second guide section 241 at the rightward end portion, located rearward with respect to the plate section 131 of the fixture metal plate 13 and supports the plate section 131 on the second surface 131B. The third guiding piece 241c is located lower-frontward with respect to the second guiding piece 241b. The third guiding piece 241c is, when the fixture metal plate 13 is guided by the second guide section 241 at the rightward end portion, located to be lower-rearward with respect to the plate section 131 of the fixture metal plate 13 and supports a lower end of the plate section 131 on the second surface 131B.

The second guide section 241 is configured to receive the rightward end portion of the fixture metal plate 13 being inserted therein from an upper-rearward side. The fixture metal plate 13 inserted in the second guide section 241 is guided by the first guiding piece 241a, the second guiding piece 241b, and the third guiding piece 241c of the second guide section 241 in the first slanting direction. As such, the second guide section 241 may guide the fixture metal plate 13 in the first slanting direction.

Fixing Member

Figure 12A:
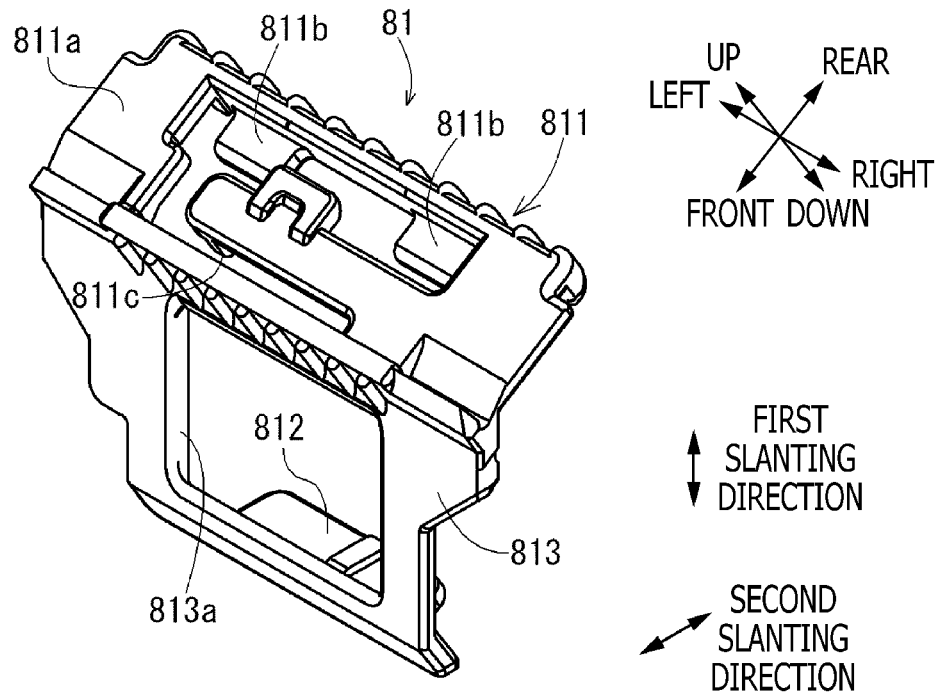
FIGS. 12A-12B are perspective views of the fixing member.
Figure 12B:
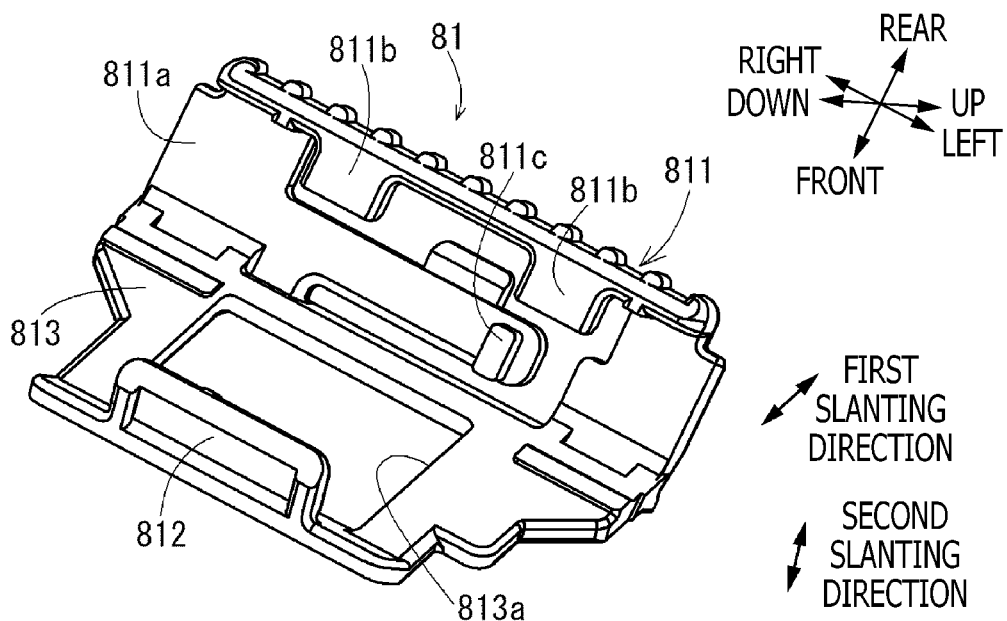

One of the fixing members 81, as shown in FIGS. 12A-12B, is attached to the leftward end portion of the fixture metal plate 13 to fix the leftward end portion of the fixture metal plate 13 guided by the first guide section 231 onto the first main frame 23. Another one of the fixing members 81, as shown in FIGS. 12A-12B, is attached to the rightward end portion of the fixture metal plate 13 to fix the rightward end portion of the fixture metal plate 13 guided by the second guide section 241 onto the second main frame 24. Each fixing member 81 includes a first engageable section 811, a second engageable section 812, and a cover section 813.

The first engageable section 811 includes a main part 811a and engageable parts 811b, which are located to be lower than the main part 811a. When the fixture metal plate 13 is fixed by the fixing member 81 to the first main frame 23 at the leftward end portion thereof, the main part 811a and the engageable parts 811b nip the first bent section 132 there-between, and thereby the first engageable section 811 is engaged with the first bent section 132. When the fixture metal plate 13 is fixed by the fixing member 81 to the second main frame 24 at the rightward end portion thereof, the main part 811a and the engageable parts 811b nip the first bent section 132 there-between, and thereby the first engageable section 811 is engaged with the first bent section 132.

The second engageable section 812 of the fixing member 81 on the left is engageable with the second bent section 133 when the fixture metal plate 13 is fixed by the fixing member 81 to the first main frame 23 at the leftward end portion thereof. The second engageable section 812 of the fixing member 81 on the right is engageable with the second bent section 133 when the fixture metal plate 13 is fixed by the fixing member 81 to the second main frame 24 at the rightward end portion thereof.

The cover section 813 of the fixing member 81 on the left may cover the first surface 131A of the plate section 131 when the fixture metal plate 13 is fixed by the fixing member 81 to the first main frame 23 at the leftward end portion thereof. The cover section 813 the fixing members 81 on the right may cover the first surface 131A of the plate section 131 when the fixture metal plate 13 is fixed by the fixing member 81 to the second main frame 24 at the rightward end portion thereof. The cover section 813 has an opening 813a, and through the opening 813a, a part of the plate section 131 located at the position of the opening 813a is exposed.

The first engageable section 811 of the fixing member 81 includes a stopper 811c, which protrudes downward. Meanwhile, the first bent section 132 of the fixture metal plate 13 has a first cutout 138a (see FIGS. 8A-8B), with which the stopper 811c is engageable, in the leftward end portion. In a state where the first engageable section 811 is fitted to the first bent section 132 in the leftward end portion of the fixture metal plate 13 and the second engageable section 812 is fitted to the second bent section 133 in the leftward end portion of the fixture metal plate 13, the fixing member 81 may be moved in the right-left direction, and thereby the stopper 811c and the first cutout 138a may be engaged. Accordingly, the fixing member 81 may be located at a correct position with respect to the leftward end portion of the fixture metal plate 13 in the right-left direction.

The fixing member 81 located at the correct position in the right-left direction with respect to the leftward end portion of the fixture metal plate 13 contacts the first guide section 231. With the fixing member 81 contacting the first guide section 231, the fixture metal plate 13 is fixed to the first main frame 23 at the leftward end portion thereof. The leftward end portion of the fixture metal plate 13 being fixed to the first main frame 23 is restricted from moving in the right-left direction and in the first slanting direction with respect to the first main frame 23.

Moreover, the first bent section 132 of the fixture metal plate 13 has a second cutout 138b (see FIGS. 8A-8B), with which the stopper 811c of the fixing member 81 is engageable, in the rightward end portion thereof. In a state where the first engageable section 811 is fitted to the first bent section 132 in the rightward end portion of the fixture metal plate 13 and the second engageable section 812 is fitted to the second bent section 133 in the rightward end portion of the fixture metal plate 13, the fixing member 81 may be moved in the right-left direction, and the stopper 811c and the second cutout 138b may be engaged. Accordingly, the fixing member 81 may be located at a correct position with respect to the rightward end portion of the fixture metal plate 13 in the right-left direction.

The fixing member 81 located at the correct position in the right-left direction with respect to the rightward end portion of the fixture metal plate 13 contacts the second guide section 241. With the fixing member 81 contacting the second guide section 241, the fixture metal plate 13 is fixed to the second main frame 24 at the rightward end portion thereof. The rightward end portion of the fixture metal plate 13 being fixed to the second main frame 24 is restricted from moving in the right-left direction and in the first slanting direction with respect to the second main frame 24.

On the other hand, by disengaging the stopper 811c of the fixing member 81 on the left from the first cutout 138a and the stopper 811c of the fixing member 81 on the right from the second cutout 138b, the fixture metal plate 13 may be disengaged from the first main frame 23 and the second main frame 24. Thereby, the fixture metal plate 13 is enabled to move in the first slanting direction.

By moving the fixture metal plate 13, on which the first sensor unit 7A and the second sensor unit 7B are mounted, upward, the first sensor unit 7A and the second sensor unit 7B may be removed from the first main frame 23 and the second main frame 24.

In this arrangement, the first guide section 231 and the second guide section 241 are located lower-rearward with respect to the transfer belt 41, and the first slanting direction is the direction along the tangential direction td, which is tangent to the curved section 41a at the position in the lower half of the curved section 41a. Therefore, the fixture metal plate 13 may be moved upward along the first slanting direction from the rear side of the transfer belt 41 to be removed from the first main frame 23 and the second main frame 24 easily.

Meanwhile, the orientation from the lower side toward the upper side along the first slanting direction coincides with the direction from the first guide section 231 toward the fuser 60, and the fuser 60 is located closer to the rear ends than to the front ends of the first main frame 23 and the second main frame 24. Therefore, by removing the fuser 60 from the first main frame 23 and the second main frame 24, the fixture metal plate 13 may be installed in or removed from the first and second main frames 23, 24 easily.

Sensor Unit

As shown in FIG. 7, the first sensor unit 7A in the sensor unit 7 includes a first substrate 70, a housing 72, and a lens 73. The second sensor unit 7B in the sensor unit 7 includes a second substrate 71, a housing 72, and a lens 73. The first sensor unit 7A and the second sensor unit 7B are different in that the first sensor unit 7A has the first substrate 70, whereas the second sensor unit 7B has the second substrate 71, but the remainders are the same.

First Sensor Unit

First Substrate

Figure 13A:
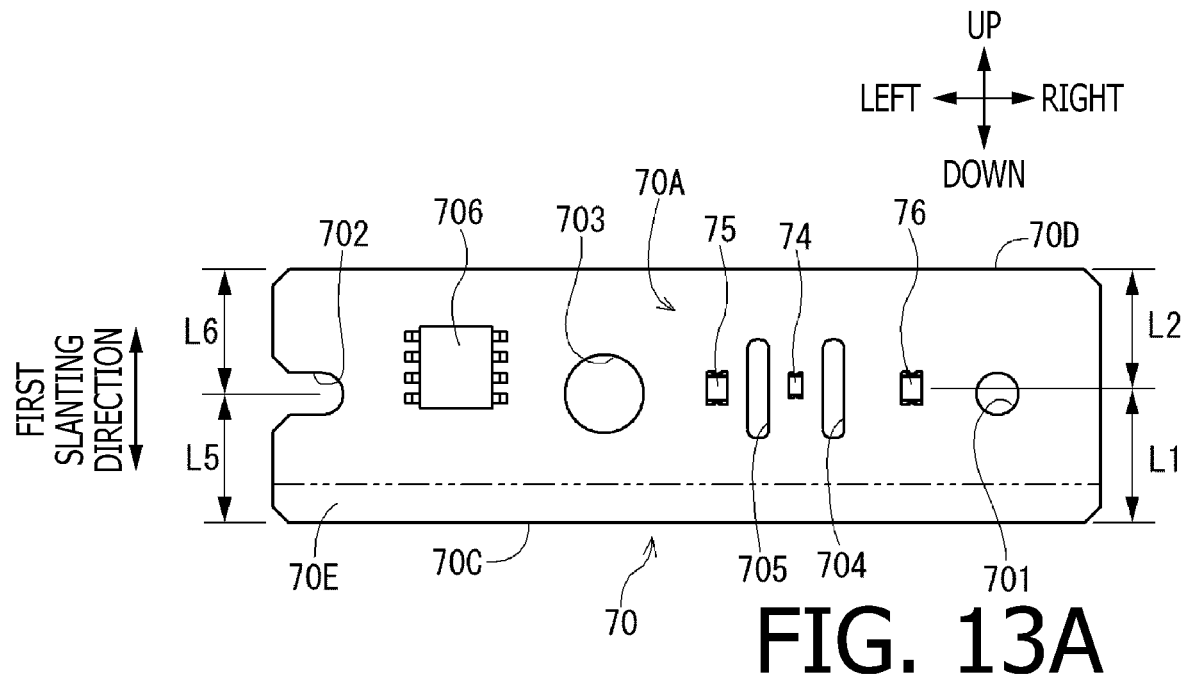
FIG. 13A is a plan view of a first surface of a first substrate.
Figure 13B:
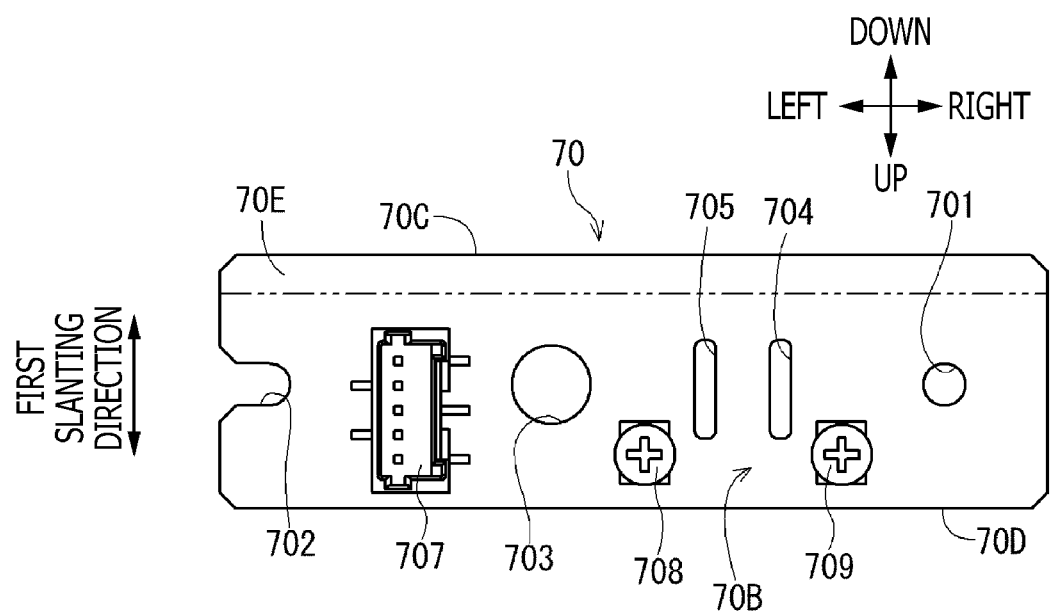
FIG. 13B is a plan view of a second surface of the first substrate.

As shown in FIGS. 13A-13B and 17A, the first substrate 70 is in a substantially rectangular form, of which longer sides align with the right-left direction. In other words, the first substrate 70 extends longitudinally in the right-left direction. The first substrate 70 is an example of the substrate. The first substrate 70 is a double-sided board made of, for example, glass epoxy resin and has a first surface 70A and a second surface 70B opposite to the first surface 70A. The first substrate 70 has a lower end 70C, which is located toward the second bent section 133 in the first slanting direction, and an upper end 70D, which is located toward the first bent section 132 in the first slanting direction, when the first sensor unit 7A is mounted on the fixture metal plate 13.

In the first substrate 70, a first positioning hole 701, a second positioning hole 702, an insertion hole 703, and slits 704, 705 are formed. In the first substrate 70, the first positioning hole 701, the slit 704, the slit 705, the insertion hole 703, and the second positioning hole 702 are arranged in this recited order from right to left.

On the first surface 70A of the first substrate 70, a light emitter 74, a first light receiver 75, a second light receiver 76, and a first mounted device 706, e.g., LSI, are mounted. The light emitter 74 may emit light at the surface of the transfer belt 41. The first light receiver 75 and the second light receiver 76 may receive the light reflected off the surface of the transfer belt 41. In particular, the first light receiver 75 may mainly receive the light specularly reflected off the surface of the transfer belt 41, and the second light receiver 76 may mainly receive the light diffusely reflected off the surface of the transfer belt 41. Optionally, the first light receiver 75 may be configured to mainly receive the light diffusely reflected off the surface of the transfer belt 41, and the second light receiver 76 may be configured to mainly receive the light specularly reflected off the surface of the transfer belt 41. Whether the first light receiver 75 and the second light receiver 76 receive diffusely reflected light or specularly reflected light may be determined depending on the positional relation among the housing 72, the first and second light receivers 75, 76, and the light emitter 74, which will be described further below.

According to the first substrate 70 in the present embodiment, with the first light receiver 75 and the second light receiver 76 mounted thereon, the specularly reflected light may be received by the first light receiver 75, and the diffusely reflected light may be received by the second light receiver 76. As such, accuracy of the first sensor unit 7A to detect the light may be improved.

On the first surface 70A, the second light receiver 76, the light emitter 74, the first light receiver 75, and the first mounted device 706 are arranged in this recited order from right to left. In the right-left direction, the second light receiver 76 is located between the first positioning hole 701 and the slit 704, the light emitter 74 is located between the slit 704 and the slit 705, the first light receiver 75 is located between the slit 705 and the insertion hole 703, and the first mounted device 706 is located between the insertion hole 703 and the second positioning hole 702.

On the second surface 70B of the first substrate 70, a female connector 707 and second mounted devices 708, 709, such as variable resistors, are mounted. The female connector 707 is an example of the connector. On the second surface 70B, the second mounted device 709, the second mounted device 708, and the female connector 707 are arranged in this recited order from right to left. In the right-left direction, the second mounted device 709 is located between the first positioning hole 701 and the slit 704, the second mounted device 708 is located between the slit 705 and the insertion hole 703, and the female connector 707 is located between the insertion hole 703 and the second positioning hole 702.

The light emitter 74, the first light receiver 75, and the second light receiver 76 mounted on the first surface 70A of the first substrate 70 are located closer to the upper end 70D than to the lower end 70C of the first substrate 70 in the first slanting direction. In other words, a distance L1 between the lower end 70C and the light emitter 74, the first light receiver 75, and the second light receiver 76 in the first slanting direction is greater than a distance L2 between the upper end 70D and the light emitter 74, the first light receiver 75, and the second light receiver 76 in the first slanting direction.

Similarly, the first mounted device 706 mounted on the first surface 70A of the first substrate 70, the female connector 707, the second mounted device 708, and the second mounted device 709 mounted on the second surface 70B of the first substrate 70 are located closer to the upper end 70D than to the lower end 70C of the first substrate 70 in the first slanting direction.

Moreover, the first positioning hole 701, the second positioning hole 702, the insertion hole 703, and the slits 704, 705 formed in the first substrate 70 are located closer to the upper end 70D than to the lower end 70C of the first substrate 70 in the first slanting direction. In other words, a distance L5 between the lower end 70C and the first positioning hole 701, the second positioning hole 702, the insertion hole 703, and the slits 704, 705 in the first slanting direction is greater than a distance L6 between the upper end 70D and the first positioning hole 701, the second positioning hole 702, the insertion hole 703, and the slits 704, 705 in the first slanting direction.

Housing

Figure 14A:
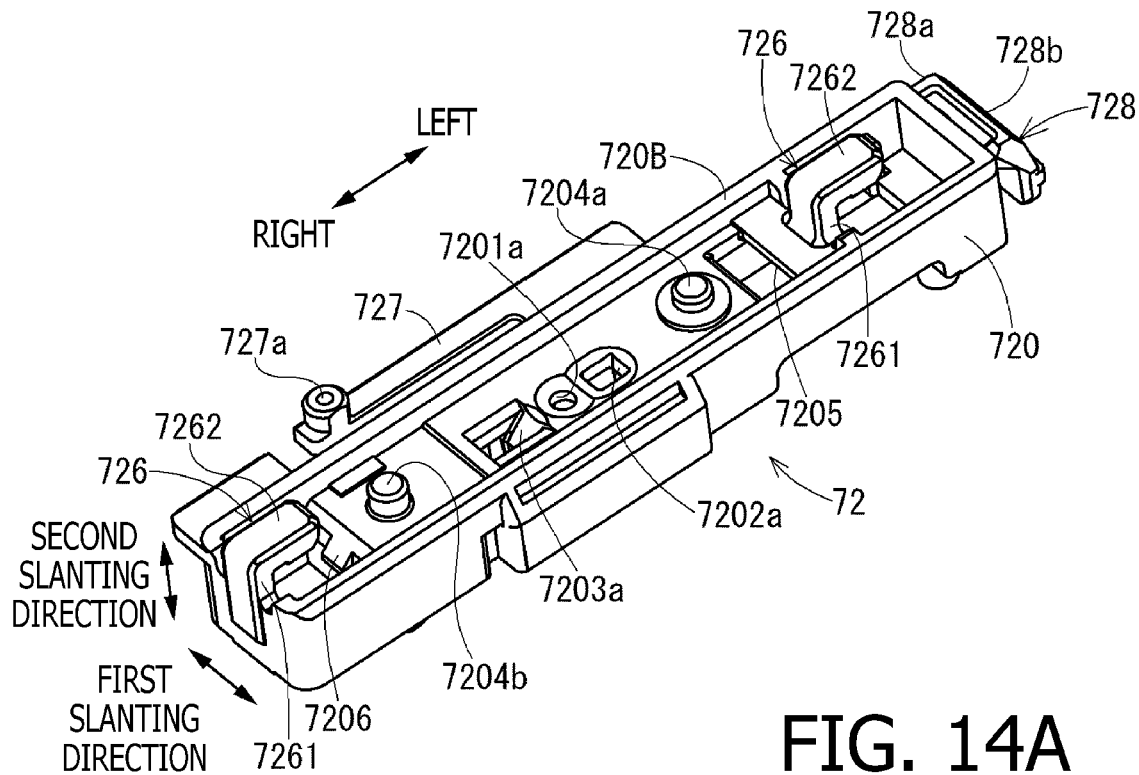
FIGS. 14A-14B are perspective views of a housing.
Figure 14B:
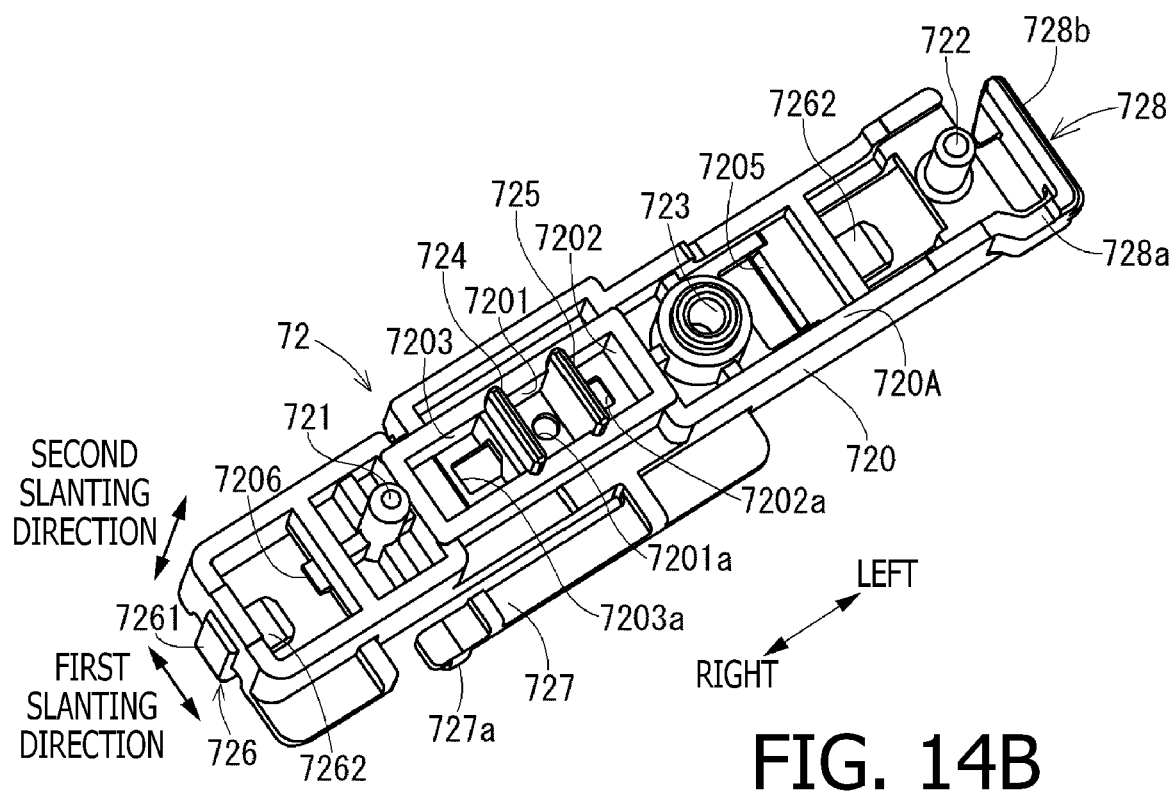

As shown in FIGS. 14A-14B and 17A, the housing 72 includes a housing body 720 having a substantially parallelepiped form, of which longer sides align with the right-left direction. The housing body 720 includes a fixture surface 720A, onto which the first surface 70A of the first substrate 70 is fixed, and an attachable surface 720B on a side opposite to the fixture surface 720A. The fixture surface 720A and the attachable surface 720B are surfaces spreading in parallel to the right-left direction and the first slanting direction.

In the housing body 720, an emitted-light guiding path 7201 between the fixture surface 720A and the attachable surface 720B, a first receiving-light guiding path 7202 between the fixture surface 720A and the attachable surface 720B, and a second receiving-light guiding path 7203 between the fixture surface 720A and the attachable surface 720B are formed there-through. Through the emitted-light guiding path 7201, the first receiving-light guiding path 7202, and the second receiving-light guiding path 7203, the light emitted from the light emitter 74, the light to be received by the first light receiver 75, and the light to be received by the second light receiver 76 may pass, respectively. The emitted-light guiding path 7201, the first receiving-light guiding path 7202, and the second receiving-light guiding path 7203 are formed through the housing body 720 along the second slanting direction.

In the state where the first substrate 70 is fixed to the fixture surface 720A of the housing body 720, the light emitter 74 faces inward into the emitted-light guiding path 7201, the first light receiver 75 faces inward into the first receiving-light guiding path 7202, and the second light receiver 76 faces inward into the second receiving-light guiding path 7203.

The attachable surface 720B of the housing body 720 has a light-emitter opening 7201a, at which the emitted-light guiding path 7201 is open, a first light-receiver opening 7202a, at which the first receiving-light guiding path 7202 is open, and a second light-receiver opening 7203a, at which the second receiving-light guiding path 7203 is open.

The housing body 720 includes a first protrusion 721, a second protrusion 722, and a fixing hole 723 for locating the first substrate 70 at a correct position with respect to the housing 72. The first protrusion 721 and the second protrusion 722 protrude from the fixture surface 720A toward the first substrate 70, and the fixing hole 723 is formed to be deeper from the fixture surface 720A toward the attachable surface 720B.

For fixing the first substrate 70 to the housing 72, the first protrusion 721 is fitted in the first positioning hole 701, the second protrusion 722 is fitted in the second positioning hole 702, and a screw 91 being a fastening member is inserted in the fixing hole 723 and the insertion hole 703. The screw 91 inserted in the insertion hole 703 in the first substrate 70 is tightened in the fixing hole 723 in the housing 72, and thereby the first substrate 70 is fastened and fixed to the housing 72. The insertion hole 703 in the first substrate 70 is a fastening position, at which the first substrate 70 may be fastened to the housing 72.

The housing body 710 includes shielding protrusions 724, 725, which protrude from the fixture surface 720A toward the first substrate 70. When the first substrate 70 is being fixed to the housing 72, the shielding protrusion 724 is fitted in the slit 704, and the shielding protrusion 725 is fitted in the slit 705. With the shielding protrusions 724, 725 fitted in the slits 704, 705, the light emitted from the light emitter 74 may be prevented from leaking outside the emitted-light guiding path 7201 and from entering the first receiving-light guiding path 7202, the second receiving-light guiding path 7203 or reaching the second surface 70B of the first substrate 70.

The housing 72 includes an attachable portion 726 formed on the attachable surface 720B of the housing body 720. The attachable portion 726 protrudes in a direction to extend away from the first substrate 70 along the second slanting direction. The attachable portion 726 is formed on each end of the housing body 720 in the right-left direction. The attachable portion 726 includes a first part 7261 protruding from the attachable surface 720B in the second slanting direction and a second part 7262 extending in the right-left direction from a distal end of the first part 7261 farther from the first substrate 70. The second part 7262 extends in parallel to the attachable surface 720B. In the present embodiment, the second part 7262 extends leftward from the distal end of the first part 7261.

The housing 72 includes a resilient part 727 extending in the right-left direction. The resilient part 727 is formed on a side of the housing body 720 facing outward in the first slanting direction. The resilient part 727 includes a positioning portion 727a, which is engageable with the fixture metal plate 13, at a distal end thereof. The positioning portion 727a is a protrusion protruding in a direction to extend away from the first substrate 70 along the second slanting direction and has a cylindrical shape, of which axial direction coincides with the protruding direction.

The housing 72 includes a hook 728 extending in the first slanting direction. The hook 728 is located on one end of the housing 72 in the right-left direction. In the present embodiment, the hook 728 is formed on a leftward surface of the housing body 720. The hook 728 includes a first section 728a, which protrudes leftward from the leftward surface of the housing body 720, and a second section 728b, which extends from a leftward end of the first section 728a toward the first bent section 132 along the first slanting direction.

Lens

Figure 15A:
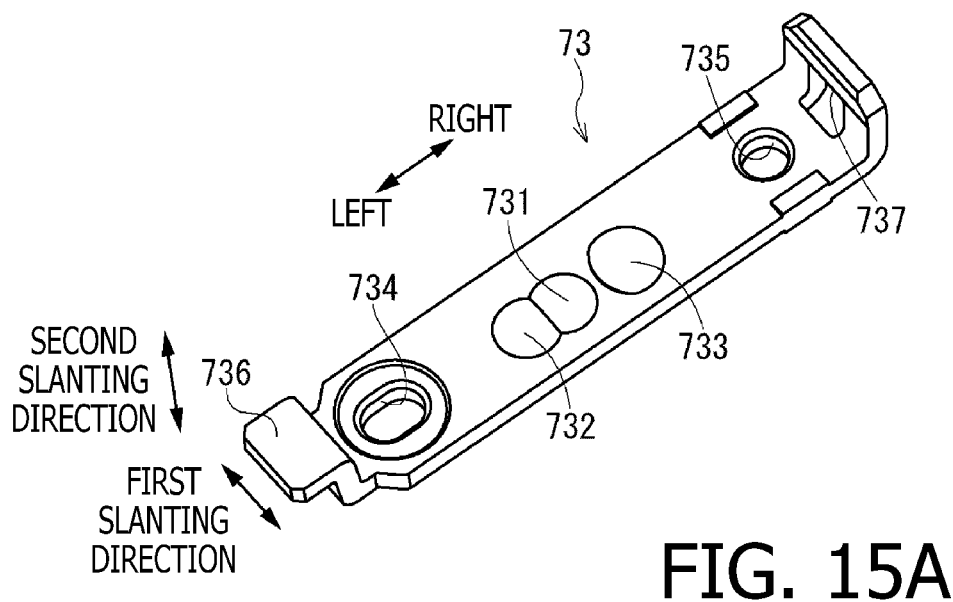
FIGS. 15A-15B are perspective views of a lens.
Figure 15B:
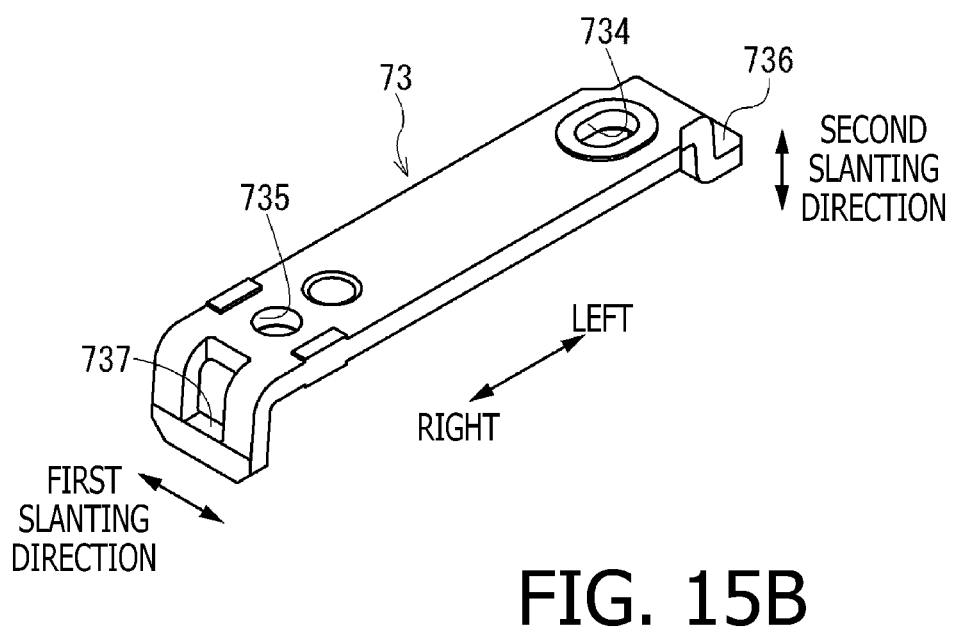

The lens 73 shown in FIGS. 15A-15B and 17A is formed of a translucent resin member. The lens 73 has a form of a plate, of which longer sides align with the right-left direction, and may be fixed to the housing 72. The resin member that forms the lens 73 may either be transparent or semi-transparent as long as the resin member is light-transmissive, but it is preferable that the resin member has higher translucency.

The lens 73 includes a light-emitter lens 731, a first light-receiver lens 732, and a second light-receiver lens 733. The light-emitter lens 731 is a lens for condensing the light emitted from the light emitter 74, the first light-receiver lens 732 is a lens for condensing the light to be received by the first light receiver 75, and the second light-receiver lens 733 is a lens for condensing the light to be received by the second light receiver 76.

The lens 73 includes a first positioning hole 734, a second positioning hole 735, an engageable part 736, and an engageable chase 737. Meanwhile, the housing body 720 of the housing 72 includes a first positioning protrusion 7204a, a second positioning protrusion 7204b, an engageable hole 7205, and an engageable protrusion 7206, on the side of the attachable surface 720B. The first positioning protrusion 7204a may be inserted in the first positioning hole 734, the second positioning protrusion 7204b may be inserted in the second positioning hole 735, the engageable hole 7205 is a hole in which the engageable part 736 may be inserted, and the engageable protrusion 7206 may engage with the engageable chase 737.

In a state where the first positioning protrusion 7204a and the second positioning protrusion 7204b are inserted in the first positioning hole 734 and the second positioning hole 735, respectively, the engageable part 736 is inserted in the engageable hole 7205 to engage with the housing body 720, and the engageable chase 737 is engaged with the engageable protrusion 7206. Thereby, the lens 73 is fixed to the attachable surface 720B of the housing 72.

In the state where the lens 73 is fixed to the housing 72, the lens 73 is located on the attachable surface 720B over the light-emitter opening 7201a, the first light-receiver opening 7202a, and the second light-receiver opening 7203a. In particular, in a view along the second slanting direction, the light-emitter lens 731 in the lens 73a is located at a position to coincide with the light-emitter opening 7201a, the first light-receiver lens 732 in the lens 73 is located at a position to coincide with the first light-receiver opening 7202a, and the second light-receiver lens 733 in the lens 73 is located at a position to coincide with the second light-receiver opening 7203a.

In this arrangement, the light emitted from the light emitter 74 and the light to be received by the first light receiver 75 and the second light receiver 76 may be condensed. In particular, the light emitted from the light emitter 74 may be condensed by the light-emitter lens 731 and irradiate the surface of the transfer belt 41. The light reflected off the surface of the transfer belt 41 may be condensed by the first light-receiver lens 732 and received by the first light receiver 75 and may be condensed by the second light-receiver lens 733 and received by the second light receiver 76.

Mounting First Sensor Unit on Fixture Metal Plate

The first sensor unit 7A is formed of the housing 72 with the first substrate 70 and the lens 73 fixed thereon. By the attachable portion 726 of the housing 72 being engaged with the fixture metal plate 13, the first sensor unit 7A may be mounted on the fixture metal plate 13.

As shown in FIGS. 8A-8B, in the plate section 131 of the fixture metal plate 13, a first sensor-attachable hole 131a is formed. The first sensor-attachable hole 131a is formed at two positions along the right-left directions in correspondence with the attachable portions 726 (see FIGS. 14A-14B) of the housing 72.

As shown in FIGS. 5 and 17A, the attachable portions 726 in the housing 72 are inserted in the first sensor-attachable holes 131a through the plate section 131 from the side of the second surface 131B, and thereafter, the housing 72 is moved leftward. Thereby, the plate section 131 of the fixture metal plate 13 is nipped between the attachable surface 720B of the housing body 720 and the second parts 7262 of the attachable portions 726.

Accordingly, the attachable portions 726 are engaged with the fixture metal plate 13, the housing 72 is fixed to the fixture metal plate 13, and the first sensor unit 7A is mounted on the fixture metal plate 13. Moreover, the first substrate 70, on which the light emitter 74, the first light receiver 75, and the second light receiver 76 are mounted, is attached to the second surface 131B of the fixture metal plate 13 in the plate section 131. The housing 72 is an example of the housing having the fixture surface and the attachable surface and including the emitted-light guiding path and the receiving-light guiding path.

In this arrangement, the first substrate 70 is fixed to the housing 72. Therefore, when the first substrate 70 and the housing 72 are being mounted through the attachable portions 726 on the fixture metal plate 13, which is a separate member from the first substrate 70 and the housing 72, the first substrate 70 and the housing 72 may be prevented from falling off inside the body 2, and the first substrate 70 and the housing 72 may be assembled easily.

Moreover, the first sensor unit 7A is mounted on the fixture metal plate 13 in the orientation such that the attachable surface 720B of the housing 72 and the plate section 131 of the fixture metal plate 13 face toward each other, and the lens 73 is arranged between the housing 72 and the plate section 131. As such, by attaching the housing 72 to the fixture metal plate 13, the lens 73 is at the same time attached to the housing 72.

Moreover, the housing 72 is fixed to the fixture metal plate 13 by nipping the plate section 131 between the attachable surface 720B of the housing body 720 and the second parts 7262 of the attachable portions 726. Accordingly, the housing 72 may be fixed to the fixture metal plate 13 easily through the attachable portions 726.

As shown in FIGS. 5 and 8A-8B, the fixture metal plate 13 includes a third cutout 134 formed in the plate section 131. In the state where the housing 72 of the first sensor unit 7A is fixed to the fixture metal plate 13, the positioning portion 727a of the housing 72 engages with the third cutout 134, and thereby the housing 72 is located at a correct position in the right-left direction with respect to the fixture metal plate 13. The third cutout 134 in the fixture metal plate 13 is an example of an engageable portion to engage with the positioning portion.

At the time when the attachable portions 726 of the housing 72 are inserted in the first sensor-attachable holes 131a in the plate section 131, the positioning portion 727a of the housing 72 and the third cutout 134 are not aligned with each other in the right-left direction, the positioning portion 727a is in contact with the second surface 131B of the plate section 131, and the resilient part 727 including the positioning portion 727a is in a reliantly deformed shape.

From this state, the housing 72 may be moved leftward. Thereby, the positioning portion 727a and the third cutout 134 align with each other in the right-left direction, and the positioning portion 727a is engaged with the third cutout 134 by the resilient force of the resilient part 727. As such, with the positioning portion 727a engaged with the third cutout 134, the housing 72 may be restricted from moving in the right-left direction and located at the correct position with respect to the fixture metal plate 13.

In this arrangement, the positioning portion 727a protrudes in the direction to extend farther from the first substrate 70 in the second slanting direction; therefore, the positioning portion 727a may easily engage with the third cutout 134 in the fixture metal plate 13, which is located farther from the first substrate 70 than the housing 72.

Moreover, since the positioning portion 727a is in the cylindrical form, when the positioning portion 727a engages with the third cutout 134, the positioning portion 727a is in point contact with an edge of the third cutout 134 in the plate section 131 of the fixture metal plate 13. Accordingly, accuracy to locate the housing 72 at the correct position with respect to the fixture metal plate 13 may be improved.

In the first sensor unit 7A, in which the housing 72 is attached to the fixture metal plate 13, with the attachable portions 726 engaged with the fixture metal plate 13, by disengaging the positioning portion 727a from the third cutout 134, the housing 72 is enabled to move rightward easily.

Moreover, by moving the housing 72 rightward to shift from the state where the plate section 131 is nipped between the attachable surface 720B and the attachable portions 726 to the state where the plate section 131 is not nipped between the attachable surface 720B and the attachable portions 726, the attachable portions 726 is enabled to be removed from the first sensor-attachable hole 131a, and the first sensor unit 7A is enabled to be demounted from the fixture metal plate 13. In other words, the housing 72 of the first sensor unit 7A is attachable to and detachable from the fixture metal plate 13 by moving in the right-left direction.

As such, by moving the housing 72 in the right-left direction, the first sensor unit 7A may be shifted from the state, in which the attachable surface 720B and the attachable portions 726 retain the plate section 131 there-between, to the state, in which the attachable surface 720B and the attachable portions 726 do not retain the plate section 131 there-between. Accordingly, the housing 72 may be attached to or detached from the fixture metal plate 13 easily.

As shown in FIG. 5, in the state where the attachable portions 726 are engaged with the fixture metal plate 13, and the housing 72 is fixed to the fixture metal plate 13, the attachable portion 726 on the left in the first sensor unit 7A protrudes toward the first surface 131A of the plate section 131 in the fixture metal plate 13. The attachable portion 726 is an example of the attachable portion protruding in the direction to extend away from the substrate.

As such, since the attachable portion 726 protrudes toward the first surface 131A of the plate section 131, compared to an arrangement, in which the attachable portion 726 protrudes from the fixture metal plate 13 in the first slanting direction, the space in which the fixture metal plate 13 occupies in the first slanting direction may be reduced. Accordingly, interference between the fixture metal plate 13 on which the first sensor unit 7A is mounted, and the fuser 60 located at the upper position with respect to the fixture metal plate 13 in the first slanting direction may be prevented.

The attachable portion 726 on the left in the first sensor unit 7A is located in a range of the opening 813a of the cover section 813 in the fixture metal plate 13 when the fixing member 81 is attached to the leftward end portion of the fixture metal plate 13 and the leftward end portion of the fixture metal plate 13 is fixed to the first main frame 23 through the fixing member 81.

Since the attachable portion 726 is located in the range of the opening 813a, when the fixing member 81 moves in the right-left direction with respect to the fixture metal plate 13, the edge of the opening 813a in the cover section 813 and the attachable portion 726 in the housing 72 contact each other, and the fixing member 81 is restricted from moving further in the right-left direction. Therefore, the fixing member 81 may be prevented from falling off from the fixture metal plate 13.

A shown in FIGS. 5, 8A-8B, and 17A, the plate section 131 in the fixture metal plate 13 has a light-passing opening 131c. The light-passing opening 131c is formed at the position to coincide with the light-emitter lens 731, the first light-receiver lens 732, and the second light-receiver lens 733 in a view along the second slanting direction. Moreover, the light-passing opening 131c is formed in a size, in which the light emitted from the light emitter 74 at the surface of the transfer belt 41 and the light reflected off the surface of the transfer belt 41 to be received by the first light receiver 75 and the second light receiver 76 may pass through. The light-passing opening 131c is an example of an opening being in a size, in which the light emitted from the light-emitter and the light reflected off the belt may pass therethrough.

As such, through the single light-passing opening 131c formed in the fixture metal plate 13, the light from the light emitter 74 in the first sensor unit 7A may be emitted at the transfer belt 41, and the light reflected off the transfer belt 41 may be received by the first light receiver 75 and the second light receiver 76 in the first sensor unit 7A.

Second Sensor Unit

Second Substrate

Figure 16A:
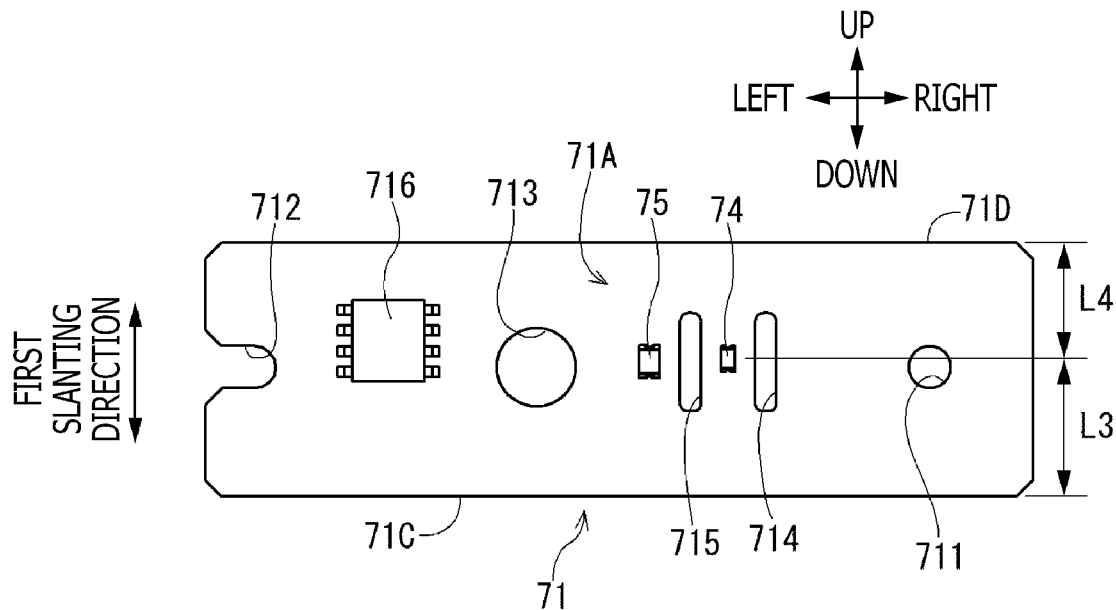
FIG. 16A is a plan view of a first surface of a second substrate.
Figure 16B:
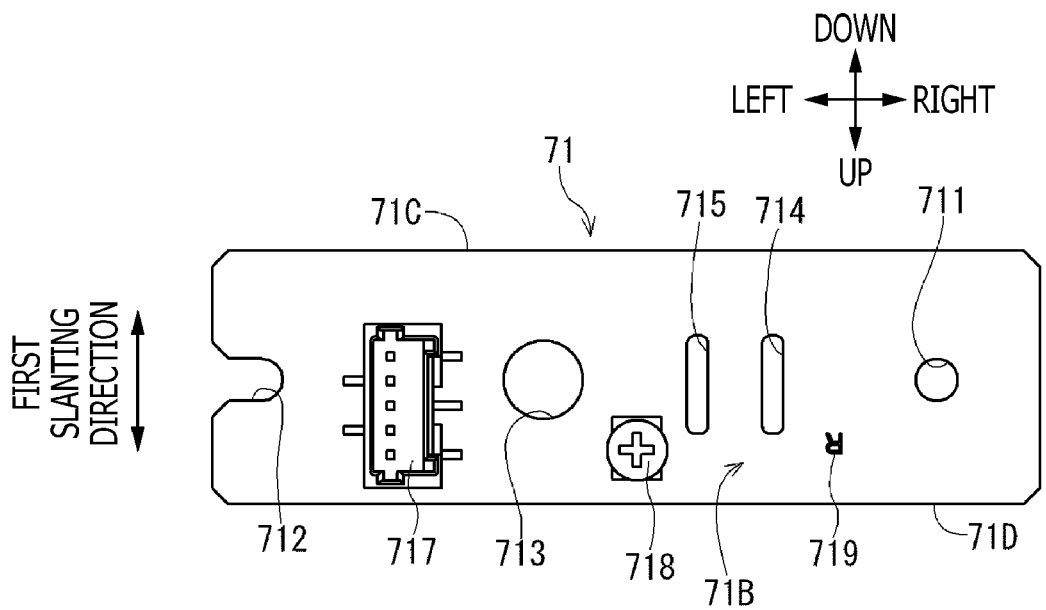
FIG. 16B is a plan view of a second surface of the second substrate.

As shown in FIGS. 16A-16B and 17B, the second substrate 71 is in a substantially rectangular form, of which longer sides extend in the right-left direction. In other words, the second substrate 71 extends longitudinally in the right-left direction. The second substrate 71 is another example of the substrate. The second substrate 71 is a double-sided board made of, for example, glass epoxy resin and has a first surface 71A and a second surface 71B opposite to the first surface 71A. The second substrate 71 has a lower end 71C, which is located toward the second bent section 133 in the first slanting direction, and an upper end 71D, which is located toward the first bent section 132 in the first slanting direction, when the second sensor unit 7B is mounted on the fixture metal plate 13. In the second substrate 71, a first positioning hole 711, a second positioning hole 712, an insertion hole 713, and slits 714, 715 are formed. On the second substrate 71, the first positioning hole 711, the slit 714, the slit 715, the insertion hole 713, and the second positioning hole 712 are arranged in this recited order from right to left.

On the first surface 71A of the second substrate 71, a light emitter 74, a first light receiver 75, and a first mounted device 716, e.g., LSI, are mounted. Note that a second light-emitter device is not provided to the second substrate 71.

On the first surface 71A, the light emitter 74, the first light receiver 75, and the first mounted device 716 are arranged in this recited order from right to left. In the right-left direction, the light emitter 74 is located between the slit 714 and the slit 715, the first light receiver 75 is located between the slit 715 and the insertion hole 713, and the first mounted device 716 is located between the insertion hole 713 and the second positioning hole 712.

On the second surface 71B of the second substrate 71, a female connector 717 and a second mounted device 718, such as a variable resistor, are mounted. The female connector 717 is an example of a connector. On the second surface 71B, the second mounted device 708 and the female connector 717 are arranged in this recited order from right to left. In the right-left direction, the second mounted device 718 is located between the slit 715 and the insertion hole 713, and the female connector 717 is located between the insertion hole 713 and the second positioning hole 712.

The light emitter 74 and the first light receiver 75 mounted on the first surface 71A of the second substrate 71 are located closer to the upper end 71D than to the lower end 71C of the second substrate 71 in the first slanting direction. In other words, a distance L3 between the lower end 71C and the light emitter 74 and the first light receiver 75 in the first slanting direction is greater than a distance L4 between the upper end 71D and the light emitter 74 and the first light receiver 75 in the first slanting direction.

Similarly, the first mounted device 716 mounted on the first surface 71A of the second substrate 71 and the female connector 717 and the second mounted device 718 mounted on the second surface 71B of the second substrate 71 are located closer to the upper end 71D than to the lower end 71C in the first slanting direction.

Moreover, the first positioning hole 711, the second positioning hole 712, the insertion hole 713, and the slits 714, 715 formed in the second substrate 71 are located closer to the upper end 71D than to the lower end 71C in the first slanting direction.

Note that the first substrate 70 forming the first sensor unit 7A has the light emitter 74, the first light receiver 75, and the second light receiver 76 mounted thereon. On the other hand, the second substrate 71 forming the second sensor unit 7B has the light emitter 74 and the first light receiver 75 mounted thereon but is different from the first substrate 70 in that the second light receiver 76 is not mounted thereon.

Meanwhile, the form of the first substrate 70 and the form of the second substrate 71 are substantially equal; therefore, whether the board serves as the first substrate 70 or as the second substrate 71 may depend on the parts and the devices mounted thereon. However, sizes of the light-emitters 74, the first light receivers 75, and the second light receiver 76 may be too small for a worker to visually identify the first substrate 70 and the second substrate 71 depending on the presence or absence of the second light receiver 76.

Therefore, the first substrate 70 and the second substrate 71 have marks 719, by which the first substrate 70 and the second substrate 71 may be identified, on the second surface 70B and the second surface 71B, respectively. The marks 719 may be formed in, for example, a heat-resistant silk-screen printing process on the second surface 70B and the second surface 71B.

The mark 719 on the second substrate 71 may be located, for example, between the first positioning hole 711 and the slit 714 in the right-left direction. On the other hand, at the position on the second surface 70B of the first substrate 70 between the first positioning hole 701 and the slit 704, the second mounted device 709 is mounted. Therefore, the mark 719 may be concealed underneath the second mounted device 709, and the worker may identify the first substrate 70 and the second substrate 71 depending on the appearance of the marks 719.

The first substrate 70 forming the first sensor unit 7A and the second substrate 71 forming the second sensor unit 7B are located in the vicinities of the fuser 60 and may be exposed to the heat from the fuser 60. Meanwhile, silkscreen printing is a heat-resistant printing method; therefore, even in the case where the first substrate 70 and the second substrate 71 are exposed to the heat from the fuser 60, the marks 719 may be prevented from producing ultra fine particles.

The mark 719 on the second substrate 71 is, when the second sensor unit 7B is mounted in the rightward end portion of the fixture metal plate 13, located on the leftward side of the fixture metal plate. Therefore, the mark 719 on the second substrate 71 may be in a form of, for example, but not necessarily, the letter "R" in alphabet.

Fixing Second Substrate to Housing

The second substrate 71 is fixed to the housing 72 in the same manner as the first substrate 70. For fixing the second substrate 71 to the housing 72, the first protrusion 721 is fitted in the first positioning hole 711, the second protrusion 722 is fitted in the second positioning hole 712, and a screw 91 being a fastening member is inserted in the fixing hole 723 and the insertion hole 713. The screw 91 inserted in the insertion hole 713 in the second substrate 71 is tightened in the fixing hole 723 in the housing 72, and thereby the second substrate 71 is fastened and fixed to the housing 72. The insertion hole 713 in the second substrate 71 is a fastening position, at which the second substrate 71 may be fastened to the housing 72.

When the second substrate 71 is being fixed to the housing 72, the shielding protrusion 724 is fitted in the slit 714, and the shielding protrusion 725 is fitted in the slit 715. With the shielding protrusions 724, 725 fitted in the slits 714, 715, the light emitted from the light emitter 74 may be prevented from leaking outside the emitted-light guiding path 7201 and entering the first receiving-light guiding path 7202, the second receiving-light guiding path 7203 or reaching the second surface 71B of the second substrate 71.

Mounting Second Sensor Unit on Fixture Metal Plate

The second sensor unit 7B is formed of the housing 72 with the second substrate 71 and the lens 73 fixed thereon. By the attachable portions 726 of the housing 72 being engaged the fixture metal plate 13, the second sensor unit 7B may be mounted on the fixture metal plate 13. The second sensor unit 7B is mountable on the fixture metal plate 13 in the same manner as the first sensor unit 7A.

As shown in FIGS. 8A-8B, in the plate section 131 of the fixture metal plate 13, a second sensor-attachable hole 131b is formed. The second sensor-attachable hole 131b is formed at two positions along the right-left directions in correspondence with the attachable portions 726 of the housing 72.

As shown in FIGS. 5 and 17B, the attachable portions 726 in the housing 72 are inserted in the second sensor-attachable holes 131b through the plate section 131 from the side of the second surface 131B, and thereafter, the housing 72 is moved leftward. Thereby, the plate section 131 of the fixture metal plate 13 is nipped between the attachable surface 720B of the housing body 720 and the second parts 7262 of the attachable portions 726.

Accordingly, the attachable portions 726 are engaged with the fixture metal plate 13, the housing 72 is fixed to the fixture metal plate 13, and the second sensor unit 7B is mounted on the fixture metal plate 13. Moreover, the second substrate 71, on which the light emitter 74 and the first light receiver 75 are mounted, is attached to the second surface 131B of the fixture metal plate 13 in the plate section 131.

As shown in FIGS. 5 and 8A-8B, the fixture metal plate 13 includes a fourth cutout 135 formed in the plate section 131. In the state where the housing 72 of the second sensor unit 7B is fixed to the fixture metal plate 13, the positioning portion 727a of the housing 72 engages with the fourth cutout 135, and thereby the housing 72 is located at a correct position in the right-left direction with respect to the fixture metal plate 13. The fourth cutout 135 in the fixture metal plate 13 is another example of the engageable portion to engage with the positioning portion.

With the attachable portion 726 of the housing 72 inserted in the second sensor-attachable hole 131b in the plate section 131, by moving the housing 72 leftward, the positioning portion 727a may engage with the fourth cutout 135, and the housing 72 may be restricted from moving in the right-left direction with respect to the fixture metal plate 13. As such, the housing 72 may be located at the correct position with respect to the fixture metal plate 13.

On the other hand, the second sensor unit 7B may be demounted from the fixture metal plate 13 by disengaging the positioning portion 727a from the fourth cutout 135 and moving the housing 72 rightward.

As shown in FIG. 5, in the state where the attachable portions 726 are engaged with the fixture metal plate 13, and the housing 72 is fixed to the fixture metal plate 13, the attachable portion 726 on the right in the second sensor unit 7B protrudes toward the first surface 131A of the plate section 131 of the fixture metal plate 13.

The attachable portion 726 on the right in the second sensor unit 7B is located in the range of the opening 813a of the cover section 813 in the fixture metal plate 13 when the fixing member 81 is attached to the rightward end portion of the fixture metal plate 13 and the rightward end portion of the fixture metal plate 13 is fixed to the second main frame 24 through the fixing member 81. By locating the attachable portion 726 in the opening 813a in the cover section 813, the fixing member 81 may be prevented from falling off from the fixture metal plate 13.

A shown in FIGS. 5, 8A-8B, and 17B, the plate section 131 in the fixture metal plate 13 has a light-passing opening 131d. The light-passing opening 131d is formed at the position to coincide with the light-emitter lens 731, the first light-receiver lens 732, and the second light-receiver lens 733 in the view along the second slanting direction. Moreover, the light-passing opening 131d is formed in a size, in which the light emitted from the light emitter 74 at the surface of the transfer belt 41 and the light reflected off the surface of the transfer belt 41 to be received by the first light receiver 75 may pass through. The light-passing opening 131d is another example of the opening being in the size, in which the light emitted from the light-emitter and the light reflected off the belt may pass there-through.

As such, through the single light-passing opening 131d formed in the fixture metal plate 13, the light from the light emitter 74 in the second sensor unit 7B may be emitted at the transfer belt 41, and the light reflected off the transfer belt 41 may be received by the first light receiver 75 in the second sensor unit 7B.

Figure 18:
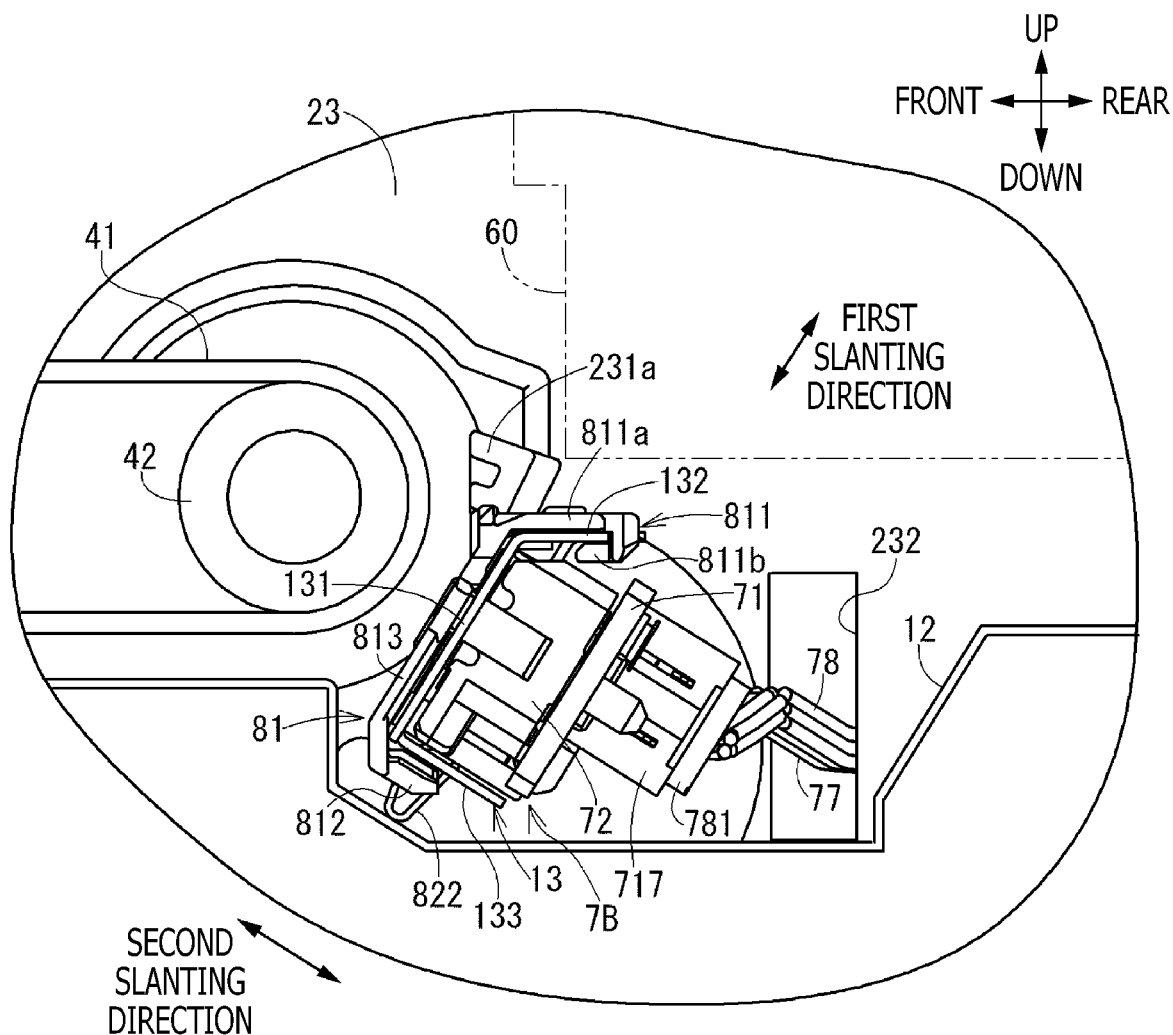
FIG. 18 is a cross-sectional view of the fixture metal plate, with the sensor unit, the ground spring, and the fixing member, fixed to a main frame.
Figure 19:
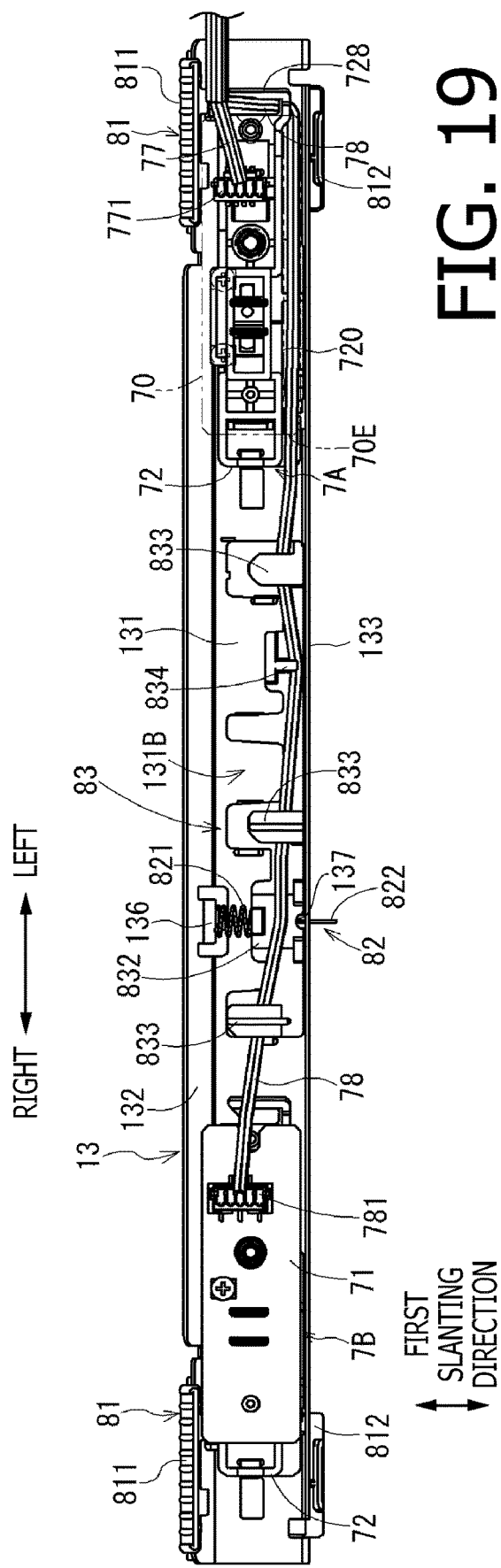
FIG. 19 is a cross-sectional view of the fixture metal plate with the sensor unit, the ground spring, and the fixing member, viewed along a second slanting direction.
Figure 20:
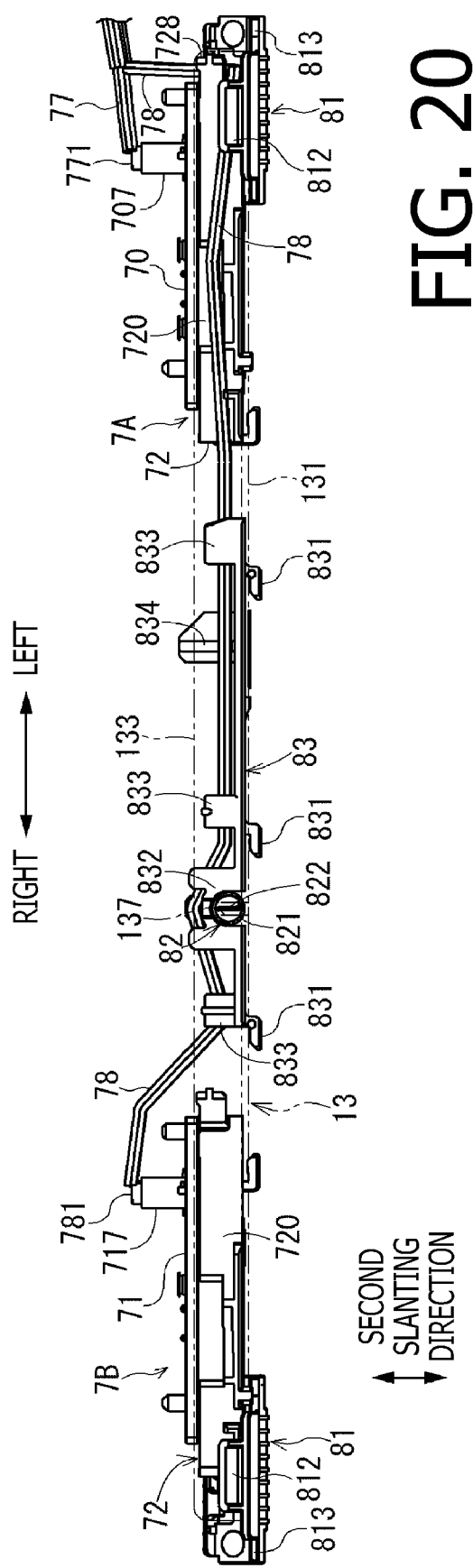
FIG. 20 is a side view of the fixture metal plate with the sensor unit, the ground spring, the fixing members, and the spring guide.

As shown in FIG. 18, the second sensor unit 7B mounted on the fixture metal plate 13 is, in the view along the right-left direction, located in a region surrounded by the plate section 131 of the fixture metal plate 13, on which the second sensor unit 2B is mounted, and the first bent section 132 and the second bent section 133, which may subsidiarily enhance the fixture metal plate 13. As such, the space required to arrange the second sensor unit 7B may be reduced.

Similarly, the first sensor unit 7A mounted on the fixture metal plate 13 is, in the view along the right-left direction, located in a region surrounded by the plate section 131 of the fixture metal plate 13, on which the first sensor unit 7A is mounted, and the first bent section 132 and the second bent section 133, which may subsidiarily enhance the fixture metal plate 13. As such, the space required to arrange the first sensor unit 7A may be reduced.

As shown in FIG. 18, the second sensor unit 7B is attached to the plate section 131 of the fixture metal plate 13 extending along the first slanting direction. Meanwhile, the first bent section 132 of the fixture metal plate 13 extends along the front-rear direction. Accordingly, between the second sensor unit 7B and the first bent section 132 in the vertical direction, a gap is created.

When the fixing member 81 is being attached to the fixture metal plate 13, the engageable parts 811b of the first engageable section 811, which are engageable with the first bent section 132 of the fixture metal plate 13, are located to be lower than the first bent section 132. In this regard, the gap reserved between the second sensor unit 7B and the first bent section 132 enables the engageable part 811b to be located between the second sensor unit 7B and the first bent section 132.

As such, while the space to arrange the second sensor unit 7B may be reduced, the fixing member 81 may be attached to the fixture metal plate 13 easily. The first sensor unit 7A may be arranged space-efficiently in the same manner.

As shown in FIG. 18, the second bent section 133 of the fixture metal plate 13 formed of the conductive material is located closer to the second substrate 71 than to the first bent section 132 in the first slanting direction. Meanwhile, on the second substrate 71, the light emitter 74, the first light receiver 75, the first mounted device 716, the female connector 717, and the second mounted device 718 are located closer to the upper end 71D on the side of the first bent section 132 than to the lower end 71C on the side of the second bent section 133. Therefore, the devices mounted on the second substrate 71 may be securely separated and insulated from the second bent section 133 located in the vicinity of the second substrate 71.

Similarly, the second bent section 133 of the fixture metal plate 13 is located closer to the first substrate 70 than to the first bent section 132 in the first slanting direction. Meanwhile, on the first substrate 70, the light emitter 74, the first light receiver 75, the second light receiver 76, the first mounted device 706, the female connector 707, the second mounted device 708, and the second mounted device 709 are located closer to the upper end 70D on the side of the first bent section 132 than to the lower end 70C on the side of the second bent section 133. Therefore, the devices mounted on the first substrate 70 may be securely separated and insulated from the second bent section 133 located in the vicinity of the first substrate 70.

Harnesses

As shown in FIGS. 6, 7, and 19-21, the image forming apparatus 1 includes a first harness 77, which is connectable with the female connector 707 mounted on the first substrate 70, and a second harness 78, which is connectable with the female connector 717 mounted on the second substrate 71.

The first harness 77 includes a male connector 771. The male connector 771 inserted in the female connector 707 connects the first harness 77 to the female connector 707. The second harness 78 includes a male connector 781. The male connector 781 inserted in the female connector 717 connects the second harness 78 to the female connector 717.

The first harness 77 is extended leftward from the female connector 707. The second harness 78 is extended leftward from the female connector 717.

As show in FIG. 18, the first main frame 23 includes a through hole 232, which is formed through the first main frame 23 in the right-left direction, at a rearward position in the first guide section 231. The first harness 77 and the second harness 78 extended leftward are drawn further leftward from the first main frame 23 through the through hole 232. The first harness 77 and the second harness 78 drawn leftward from the first main frame 23 are connected to the control board 25, which is supported by the first main frame 23 on the leftward surface of the first main frame 23.

The first sensor unit 7A is connected to the control board 25 through the first harness 77, and the second sensor unit 7B is connected to the control board 25 through the second harness 78.

An end of the second harness 78 on the side of the female connector 707 is located outside the region surrounded by the plate section 131, the first bent section 132, and the second bent section 133 of the fixture metal plate 13. The second harness 78 extending leftward from the female connector 717 bends toward the plate section 131 and, in a region leftward from the second substrate 71, the second harness 78 is drawn leftward along the lengthwise direction of the fixture metal plate 13 in the region surrounded by the plate section 131, the first bent section 132, and the second bent section 133 of the fixture metal plate 13.

Figure 21:
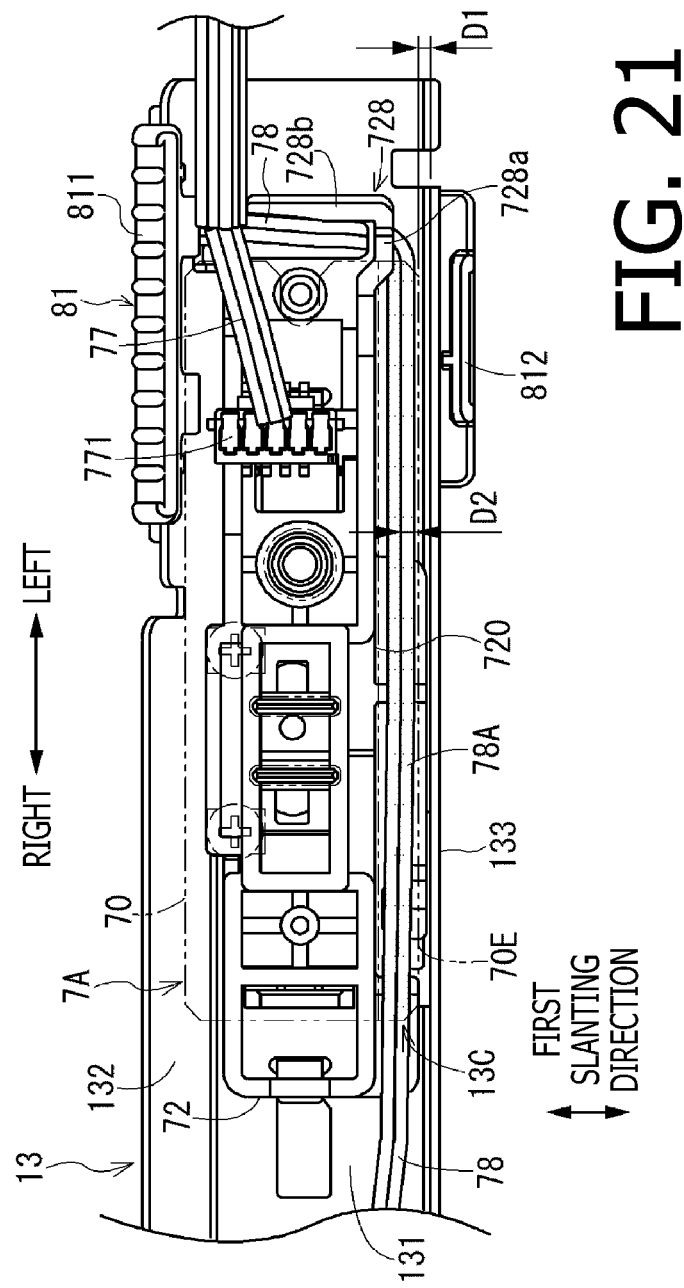
FIG. 21 is a partial view of a second harness.

As shown in FIGS. 13A-13B and 21, the first substrate 70 includes a protrusive portion 70E, which protrudes toward the second bent section 133 of the fixture metal plate 13 in the first slanting direction with respect to the housing body 720 of the housing 72.

In the first substrate 70, the first positioning hole 701, the second positioning hole 702, and the insertion hole 703 are located closer to the upper end 70D than to the lower end 70C in the first slanting direction. In other words, the distance L5 between the lower end 70C and the first positioning hole 701, the second positioning hole 702, and the insertion hole 703 is greater than the distance L6 between the upper end 70D and the first positioning hole 701, the second positioning hole 702, and the insertion hole 703 in the first slanting direction.

Therefore, for fixing the first substrate to the housing 72, when the first protrusion 721 and the second protrusion 722 in the housing 72 are fitted in the first positioning hole 701 and the second positioning hole 702 in the first substrate 70, respectively, and the screw 91 is inserted in the insertion hole 703 and the fixing hole 723, the protrusive portion 70E may be located to protrude from the housing body 720 toward the second bent section 133 easily.

Note, in the present embodiment, the first substrate 70 has the protrusive portion 70E alone that protrudes toward the second bent section 133 in the first slanging direction, but optionally, the first substrate 70 may have another protrusive portion that protrudes toward the first bent section 132 in the first slanting direction additionally to the protrusive portion 70E. Moreover, optionally, the second substrate 71 may have a protrusive portion protruding toward the second bent section 133 in the first slanting direction, and further, the second substrate 71 may have another protrusive portion that protrudes toward the first bent portion in the first slanting direction.

The fixture metal plate 13 forms a space 13C (see FIG. 21) surrounded by the plate section 131, the second bent section 133, the housing body 720 of the housing 72, and the protrusive portion 70E of the first substrate 70. The second harness 78 drawn leftward from the female connector 717 extends through the space 13C in the fixture metal plate 13. In other words, the second harness 78 includes a section 78A, as indicated in hatching in FIG. 21, surrounded by the plate section 131, the second bent section 133, the housing 72, and the protrusive portion 70E.

As such, the space 13C formed by the protrusive portion 70E of the first substrate 70 is provided, and the second harness 78 has the section 78A, which is located in the space C to be drawn in the right-left direction. Therefore, without providing a separate holder member, the second harness 78 may be prevented from deviating from the area surrounded by the plate section 131, the first bent section 132, and the second bent section 133, and the second harness 78 may be maintained in the extended form steadily.

In the first slanting direction, between the protrusive portion 70E of the first substrate 70 and the second bent section 133 of the fixture metal plate 13, a gap D1 is formed. A dimension of the gap D1 is smaller than a thickness D2 of the second harness 78. The thickness D2 of the second harness 78 may be, for example, 0.88 mm, and the dimension of the gap D1 may be, for example, 0.8 mm. As such, since the dimension of the gap D1 is smaller than the thickness D2 of the second harness 78, the second harness 78 may be prevented from deviating from the gap between the protrusive portion 70E of the first substrate 70 and the second bent section 133 of the fixture metal plate 13, and the extended form of the second harness 78 may be maintained stably.

On the leftward end of the housing body 720 in the first sensor unit 7A, a hook 728 is formed. The second harness 78 extended leftward through the space 13C is drawn between the housing body 720 and the hook 728 from the side of the plate section 131 toward the side of the first substrate 70 in the second slanting direction and drawn further leftward. The extending direction of the second harness 78 is thus restricted by the hook 728.

The second harness 78 drawn between the housing body 720 and the hook 728 is located closer to the first bent section 132 than to the first section 728a of the hook 728 in the first slanting direction and is restricted by the hook 728 from moving toward the second bent section 133. As such, with the hook 728 restricting the extending direction of the second harness 78, the second harness 78 may be prevented from contacting the second bent section 133 of the fixture metal plate 13.

As shown in FIGS. 13A-13B, in the first substrate 70, the female connector 707 mating with the first harness 77 is located opposite in the right-left direction to the first light receiver 75, the light emitter 74, and the second light receiver 76 across the insertion hole 703, at which the first substrate 70 is fastened to the fixture metal plate 13.

Therefore, compared to a case, in which the insertion hole 703, the first light receiver 75, the light emitter 74, the second light receiver 76, and the female connector 707 are arranged in this recited order in the right-left direction, the female connector 707 may be located closer to the insertion hole 703. Therefore, when the male connector 771 is pulled to be removed from the female connector 707 and the female connector 707 is pulled along with the male connector 771, the first substrate 70 may be prevented from being deformed by the pulling force.

As shown in FIGS. 16A-16B, in the second substrate 71, similarly to the first substrate 70, the female connector 717 mating with the second harness 78 is located opposite in the right-left direction to the first light receiver 75 and the light emitter 74 across the insertion hole 713. Therefore, when the female connector 717 is pulled along with the male connector 781, the second substrate 71 may be prevented from being deformed.

Ground Spring and Fixing Device for Ground Spring

As shown in FIGS. 4, 6-7, 8A-8B, 22-23, and 24A-24B, the fixture metal plate 13 includes a spring holder 136 to support a ground spring 82 and a guide 137 to guide the ground spring 82 at a central position in the right-left direction. The spring holder 136 is formed in the first bent section 132, and the guide 137 is formed in the second bent section 133. The spring holder 136 and the guide 137 are located between the first sensor unit 7A and the second sensor unit 7B in the right-left direction.

The ground spring 82 is a compression spring formed of a conductive resilient wire being wounded and bent. The ground spring 82 includes a coil portion 821 formed of the wire being wounded and a contact portion 822 formed of the wire being bent.

The ground spring 82 is arranged such that the coil portion 821 is compressed along the first slanting direction, with the coil portion 821 located toward the first bent section 132 and the contact portion 822 located closer to the second bent section 133 than the coil portion 821.

The spring holder 136 is a protrusion formed by bending the metal plate to protrude toward the second bent section 133. The spring holder 136 may support the coil portion 821 by being inserted in coil portion 821, which is wounded in a cylindrical form, from the side of the first bent section 132. The coil portion 821 and the spring holder 136 supporting the coil portion 821 are in contact with each other.

The guide 137 is a slit formed through the second bent section 133 in the first slanting direction elongated in the second slanting direction, and the contact portion 822 may pass there-through. The guide 137 may guide the contact portion 822 as the contact portion 822 passes there-through.

The ground spring 82 is arranged on the fixture metal plate 13 in an orientation such that the coil portion 821 is supported by the spring holder 136 and the contact portion 822 is guided by the guide 137, and an urging force of the ground spring 82 acts in the first slanting direction.

In the image forming apparatus 1, the first main frame 23, the second main frame 24, the fixture metal plate 13 fixed to the first main frame 23 and the second main frame 24, and the ground spring 82 attached to the fixture metal plate 13 constitute a fixing structure to fix the ground spring 82.

The ground spring 82 supported by the spring holder 136 and guided by the guide 137 is located between the first sensor unit 7A and the second sensor unit 7B in the right-left direction. In the image forming apparatus 1, by locating the ground spring 82 between the first sensor unit 7A and the second sensor unit 7B, a substantial distance between the first sensor unit 7A and the second sensor unit 7B in the right-left direction may be reserved, and the ability to correct color misalignment with use of the first sensor unit 7A and the second sensor unit 7B may be improved.

The ground spring 82 is arranged on the fixture metal plate 13 such that the coil portion 821 is located between the spring holder 136 and the guide 137, the contact portion 822 is guided by the guide 137, and a part of the contact portion 822 protrudes downward in the first slanting direction from the second bent section 133.

Figure 22:
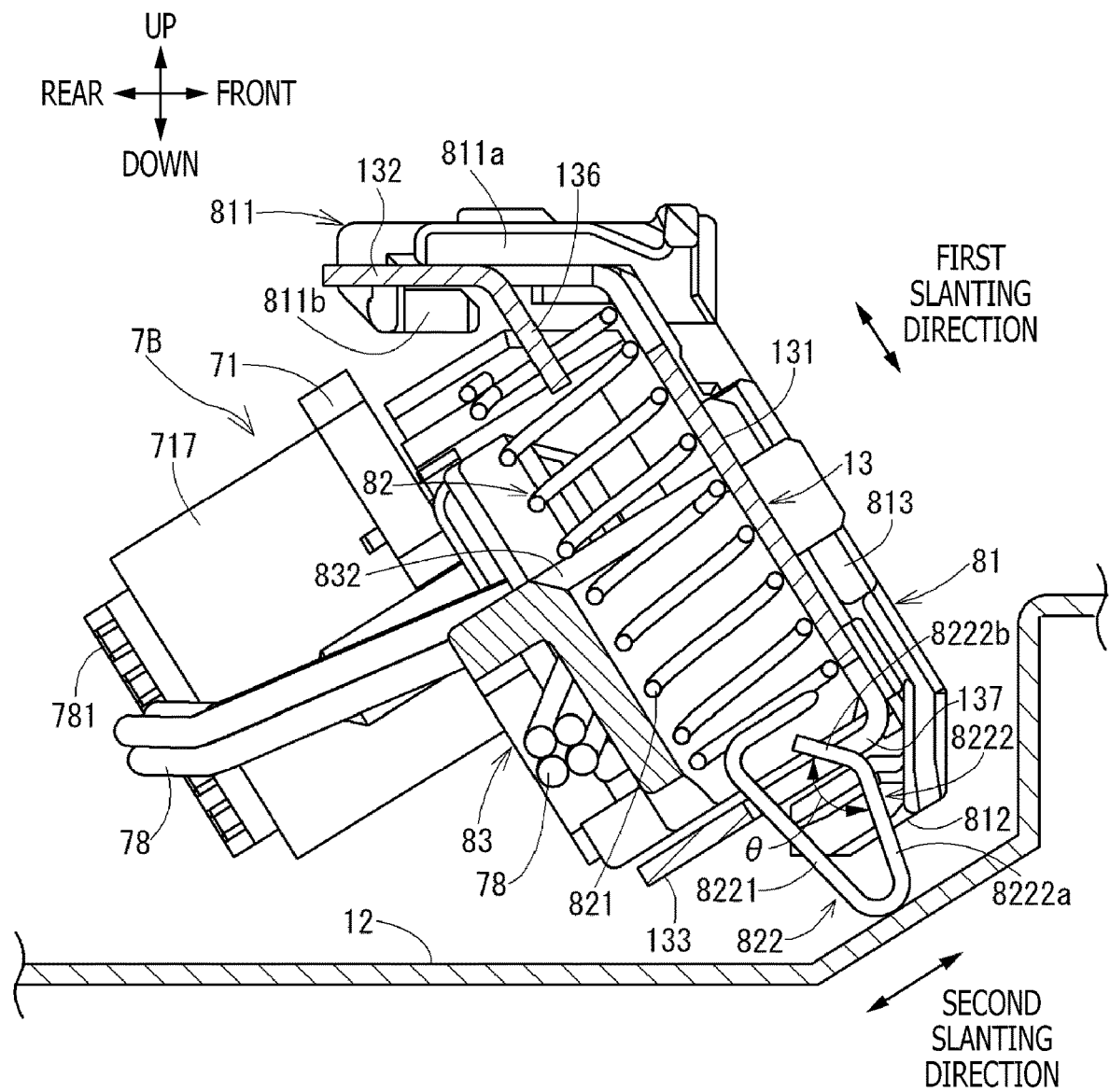
FIG. 22 is a sideward cross-sectional view of the ground spring mounted on the fixture metal plate.
Figure 23:
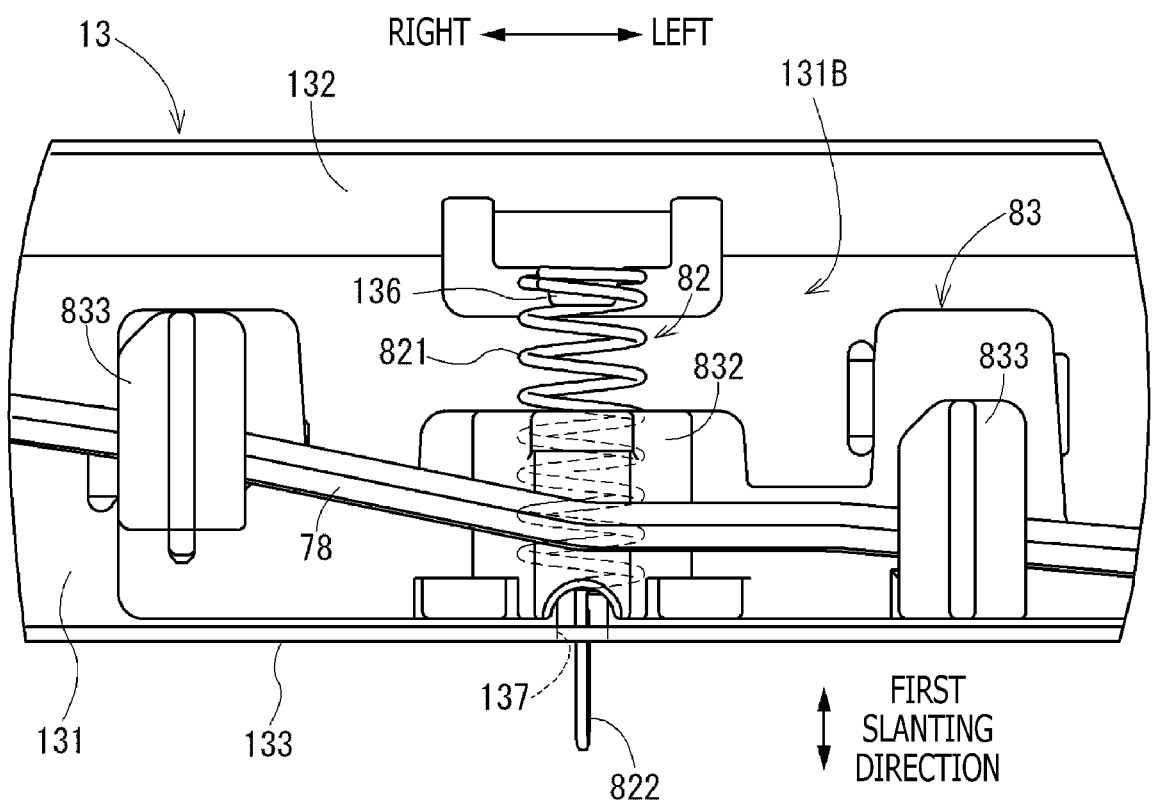
FIG. 23 is an illustrative view of the ground spring mounted on the fixture metal plate viewed along the second slanting direction.
Figure 24A:
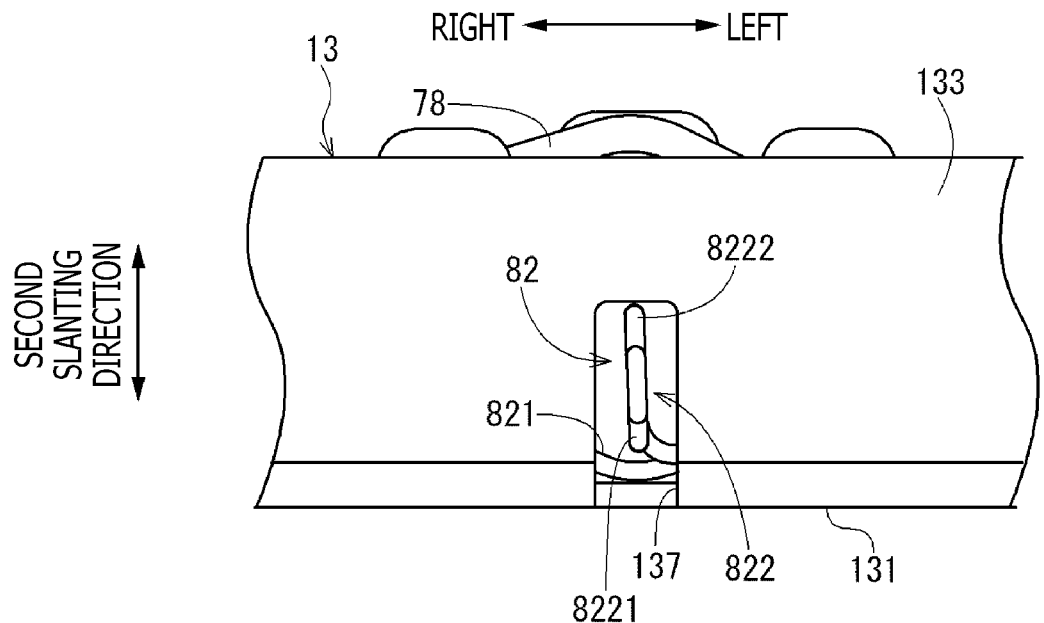
FIGS. 24A-24B are illustrative views of the ground spring mounted on the fixture metal plate viewed along the first slanting direction.
Figure 24B:
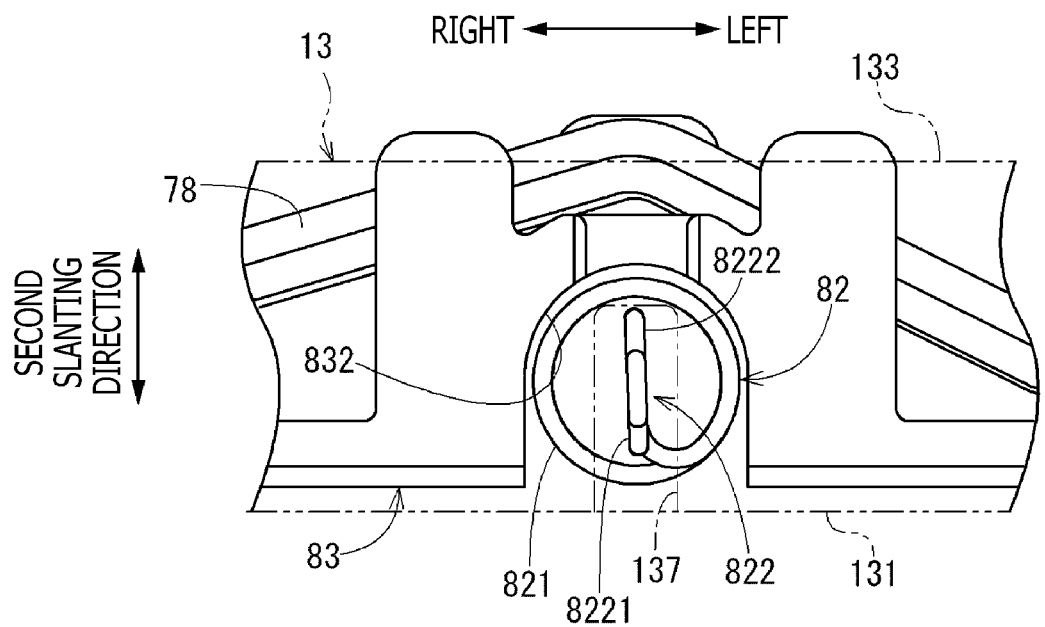

While the fixture metal plate 13 is fixed to the first main frame 23 and the second main frame 24, the contact portion 822 protruding from the second bent section 133 is in contact with the substrate cover 12, as shown in FIG. 22, due to the urging force of the ground spring 82 acting in the first slanting direction. Through the contact portion 822 contacting the substrate cover 12, the ground spring 82 and the fixture metal plate 13 on which the ground spring 82 is arranged are grounded.

When the fixture metal plate 13 is being inserted in the first guide section 231 of the first main frame 23 and the second guide section 241 of the second main frame 24, the fixture metal plate 13 is guided by the first guide section 231 and the second guide section 241 along the first slanting direction.

As such, the direction to guide the fixture metal plate 13 along the first main frame 23 and the second main frame 24 and the direction in which the urging force of the ground spring 82 arranged on the fixture metal plate 13 acts are the same direction, i.e., the first slanting direction. Therefore, when the fixture metal plate 13 is attached to or detached from the first main frame 23 and the second main frame 24, the ground spring 82 may stay on the fixture metal plate 13 without being dragged in a direction intersecting with the first slanting direction, and the ground spring 82 may be prevented from falling off from the fixture metal plate 13 or being buckled by the fixture metal plate 13.

Moreover, the compressive direction of the ground spring 82 is the first slanting direction, which is the same direction as the direction to guide the fixture metal plate 13 along the first guide section 231 and the second main frame 24. Therefore, the ground spring 82 may be prevented from falling off from the fixture metal plate 13 or being buckled by the fixture metal plate 13.

Moreover, the ground spring 82 is arranged on the fixture metal plate 13 such that the coil portion 821 is located between the first bent section 132 and the second bent section 133 of the fixture metal plate 13, and the contact portion 822 protrudes merely partly from the second bent portion. Therefore, the ground spring 82 may effectively be prevented from falling off from the fixture metal plate 13 or being buckled by the fixture metal plate 13.

Moreover, the ground spring 82 is arranged on the fixture metal plate 13 such that the part of the contact portion 822 protrudes downward in the first slanting direction from the second bent section 133 through the guide 137 being a slit. Therefore, the coil portion 821 of the ground spring 82 may be prevented from protruding downward in the first slanting direction from the second bent section 133, and the ground spring 82 may be maintained compressed securely without disruption.

As shown in FIG. 22, the contact portion 822 of the ground spring 82 includes a protruding portion 8221, which is continuous from the coil portion 821 and protrudes downward in the first slanting direction from the second bent section 133 through the guide 137, and a returning portion 8222, which turns upward in the first slanting direction at an end of the protruding portion 8221 and is inserted in the guide 137 to reenter the second bent section 133. The part of the returning portion 8222 inserted in the guide 137 is apart from the protruding portion 8221 in a lengthwise direction of the guide 137.

The returning portion 8222 includes a first returning portion 8222a and a second returning portion 8222b. The first returning portion 8222a is continuous from the end of the protruding portion 8221 and separates farther from the protruding portion 8221 along the second slanting direction as it extends upward in the first slanting direction. The second returning portion 8222b bends at an upper end of the first returning portion 8222a in the first slanting direction to extend upward and approaches closer to the protruding portion 8221 as it extends upward in the first slanting direction. In the present embodiment, the second returning portion 8222b is the part of the returning portion 8222 inserted in the guide 137.

As such, in the returning portion 8222 of the ground spring 82, the protruding portion 8221 passing through the guide 137 in the form of a slit and the returning portion 8222 are separated in the lengthwise direction of the guide 137.

Therefore, if the contact portion 822 tends to rotate in a circumferential direction of the coil portion 821, the protruding portion 8221 and the returning portion 8222 contact edges of the guide 137, and the contact portion 822 may be restricted from rotating. Accordingly, disruption in the compressing behavior of the ground spring 82 due to collision between the contact portion 822 and the second bent section 133, which may be caused by the contact portion 822 of the coil portion 821 rotating in the circumferential direction, may be avoided.

Moreover, in the returning portion 8222 of the contact portion 822, an angle θ between the first returning portion 8222a and the second returning portion 8222b is an obtuse angle. Therefore, the second returning portion 8222b inserted in the guide 137 and the second bent section 133, in which the guide 137 is formed, intersect with each other at an angle of substantial degrees rather than extending in parallel with each other. Therefore, even in a case where the contact portion 822 moves in the lengthwise direction of the guide 137, the second returning portion 8222b may help the contact portion 822 to be located at the correct position in the lengthwise direction of the guide 137, and disruption in the compressing behavior of the ground spring 82 may be avoided.

Spring Guide

As shown in FIGS. 6, 7, 19, 20, 22, and 23, the spring guide 83 may restrict the compressive direction of the ground spring 82 and includes attachable portions 831, a spring-casing portion 832, harness guides 833, and a stopper 834.

The attachable portions 831 are each in a form of a hook extending in the right-left direction. Three attachable portions 831 are formed at three positions along the right-left direction. On the other hand, in the plate section 131 of the fixture metal plate 13, spring-guide attachable holes 131e are formed (see FIGS. 7 and 8). Three spring-guide attachable holes 131e are formed at three positions along the right-left direction in one-to-one correspondence with the attachable portions 831 of the spring guide 83.

For attaching the spring guide 83 to the fixture metal plate 13, the attachable portions 831 are inserted in the spring-guide attachable holes 131e in the plate section 131 from the side of the second surface 131B, and the spring guide 83 is moved leftward. Thereby, the attachable portions 831 hook with the plate section 131, and the spring guide 83 is attached to the fixture metal plate 13.

In the spring guide 83 attached to the fixture metal plate 13, the coil portion 821 of the ground spring 82 is covered with the spring-casing portion 832. In other words, the spring-casing portion 832 accommodates the coil portion 821 of the ground spring 82, and the spring-casing portion 832 accommodating the coil portion 821 regulates the compressive direction of the ground spring 82 to the first slanting direction.

As such, by regulating the compressive direction of the ground spring 82 to the first slanting direction, the ground spring 82 may be compressed preferably and may be maintained stably in contact with the substrate cover 12 to secure conductivity. Moreover, by accommodating the ground spring 82 in the spring-casing portion 832, the ground spring 82 may be prevented from falling off from the fixture metal plate 13 and being buckled by the fixture metal plate 13.

The harness guides 833 are formed at a plurality of positions along the right-left direction. In the present embodiment, three harness guides 833 are formed at three positions. The harness guides 833 are each in a form of a hook extending along the first slanting direction and may hold the second harness 78 drawn in the right-left direction from above in the first slanting direction.

As such, by holding the second harness 78 with the harness guides 833, the second harness 78 may be guided along the fixture metal plate 13, and the second harness 78 may be prevented from deviating outside the fixture metal plate 13, and the space to be occupied by the fixture metal plate 13, on which the first sensor unit 7A and the second sensor unit 7B are mounted, may be reduced.

In the present embodiment, the harness guides 833 may hold the second harness 78. Optionally, the harness guides 833 may hold the first harness 77 in place of the second harness 78 or may hold both the first harness 77 and the second harness 78, depending on the direction to draw the first harness 77 and the second harness 78.

The stopper 834 is a protrusion located above the second harness 78 held by the harness guides 833. The stopper 834 may hold the second harness 78 held by the harness guides 833 from above. Thereby, the second harness 78 held by the harness guides 833 may be prevented from moving upward and restricted from falling off from the harness guides 833, and the form of the second harness 78 drawn along the fixture metal plate 13 may be maintained stably.

In the spring guide 83, the harness guides 833 are formed on the outer side, opposite to the side on which the spring-casing portion 832 accommodates the ground spring 82. With the harness guides 833 formed on the opposite side to the spring-casing portion 832, collision between the ground spring 82 accommodated in the spring-casing portion 832 and the first harness 77 and the second harness 78 held by the harness guides 833 may be prevented.

While the invention has been described in conjunction with the example structure outlined above and illustrated in the figures, various alternatives, modifications, variations, improvements, and/or substantial equivalents, whether known or that may be presently unforeseen, may become apparent to those having at least ordinary skill in the art. Accordingly, the example embodiment of the disclosure, as set forth above, is intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. An optical detecting apparatus, comprising:
    a substrate having a surface, on which a light emitter and a first light receiver are arranged; and
    a housing having a fixture surface, onto which the surface of the substrate is fixed, and an attachable surface on a side opposite to the fixture surface, the housing including:
        an emitted-light guiding path formed through the housing between the fixture surface and the attachable surface for light emitted from the light emitter to pass there-through; and
        a first receiving-light guiding path formed through the housing between the fixture surface and the attachable surface for light to be received by the first light receiver to pass there-through,
    wherein the housing includes an attachable portion formed on the attachable surface, the attachable portion protruding in a direction to extend away from the substrate.

2. The optical detecting apparatus according to claim 1, wherein
    the substrate includes a connector and is fixed to the housing with a fastening member, and
    the connector is located on a side opposite to the light emitter and the first light receiver across a fastening position, at which the substrate is fastened to the housing.

3. The optical detecting apparatus according to claim 1, wherein the attachable portion of the housing includes a first part protruding from the attachable surface and a second part extending from a distal end of the first part in a direction parallel to the attachable surface.

4. The optical detecting apparatus according to claim 1, wherein
    the attachable surface of the housing includes a light-emitter opening, at which the emitted-light guiding path is open, and a light-receiver opening, at which the first receiving-light guiding path is open, and
    a lens formed of translucent resin is arranged on the attachable surface over the light-emitter opening and the light-receiver opening.

5. The optical detecting apparatus according to claim 1, wherein
    a second light receiver is arranged on the surface of the substrate, and
    the housing includes a second receiving-light guiding path formed through the housing between the fixture surface and the attachable surface for light to be received by the second light receiver to pass there-through.

6. An image forming apparatus, comprising:
    a main frame;
    a fixture metal plate configured to be fixed to the main frame;
    a belt configured to convey a sheet for forming an image in toner on the sheet;
    an optical detecting apparatus mounted on the fixture metal plate and located at a position to face the belt, the optical detecting apparatus comprising:
        a substrate having a surface, on which a light emitter and a light receiver are arranged; and
        a housing having a fixture surface, onto which the surface of the substrate is fixed, and an attachable surface on a side opposite to the fixture surface, the housing including:
            an emitted-light guiding path formed through the housing between the fixture surface and the attachable surface for light emitted from the light emitter to pass there-through; and
            a receiving-light guiding path formed through the housing between the fixture surface and the attachable surface for light to be received by the light receiver to pass there-through,
    wherein the housing includes an attachable portion formed on the attachable surface, the attachable portion protruding in a direction to extend away from the substrate.

7. The image forming apparatus according to claim 6, wherein
the fixture metal plate includes an opening, and
the opening is in a size, in which the light emitted from the light emitter and light reflected off the belt are able to pass there-through.

8. The image forming apparatus according to claim 7, wherein
the optical detecting apparatus is mounted on the fixture metal plate in an orientation such that the attachable surface of the housing and the fixture metal plate face toward each other, and
a translucent resin member forming a lens is arranged between the housing and the fixture metal plate.

9. The image forming apparatus according to claim 6, wherein
the main frame includes a first main frame and a second main frame located apart from the first main frame in a particular direction,
the fixture metal plate extends in the particular direction and is fixed to the first main frame and the second main frame connecting the first main frame and the second main frame.

10. The image forming apparatus according to claim 9, wherein the housing in the optical detecting apparatus is fixed to the fixture metal plate by nipping the fixture metal plate between the attachable surface and the attachable portion.

11. The image forming apparatus according to claim 10, wherein
the attachable portion includes a first part protruding from the attachable surface, the attachable surface extending in parallel to the particular direction, and a second part extending in the particular direction from a distal end of the first part, and
the housing of the optical detecting apparatus is attachable to and detachable from the fixture metal plate by moving in the particular direction.

12. The image forming apparatus according to claim 9, wherein
the housing includes a resilient part extending in the particular direction,
the resilient part includes a positioning portion engageable with the fixture metal plate at a distal end thereof, and
the fixture metal plate includes an engageable portion configured to engage with the positioning portion.

13. The image forming apparatus according to claim 12, wherein the positioning portion is a protrusion protruding in the direction to extend away from the substrate.

14. The image forming apparatus according to claim 13, wherein the protrusion has a cylindrical shape, of which axial direction coincides with the direction to protrude.

* * * * *